(12) United States Patent
Droppers

(10) Patent No.: US 11,976,614 B1
(45) Date of Patent: May 7, 2024

(54) AFTERBURNING TURBINE EXHAUST CYCLE (ABTEC)

(71) Applicant: Pivotal Space, Inc., Denver, CO (US)

(72) Inventor: Lloyd J Droppers, Denver, CO (US)

(73) Assignee: Pivotal Space, Inc., Denver, CO (US)

( * ) Notice: Subject to any disclaimer, the term of this patent is extended or adjusted under 35 U.S.C. 154(b) by 0 days.

(21) Appl. No.: 18/457,301

(22) Filed: Aug. 28, 2023

(51) Int. Cl.
| | | |
|---|---|---|
| *F02K 9/82* | (2006.01) | |
| *F02K 9/44* | (2006.01) | |
| *F02K 9/46* | (2006.01) | |
| *F02K 9/56* | (2006.01) | |
| *F02K 9/64* | (2006.01) | |
| *F02K 9/97* | (2006.01) | |

(52) U.S. Cl.
CPC .............. *F02K 9/82* (2013.01); *F02K 9/44* (2013.01); *F02K 9/46* (2013.01); *F02K 9/56* (2013.01); *F02K 9/64* (2013.01); *F02K 9/972* (2013.01)

(58) Field of Classification Search
CPC ..... F02K 9/44; F02K 9/46; F02K 9/48; F02K 9/56; F02K 9/64; F02K 9/82; F02K 9/972
See application file for complete search history.

(56) References Cited

U.S. PATENT DOCUMENTS

| | | | | |
|---|---|---|---|---|
| 4,998,410 | A * | 3/1991 | Martinez-Leon | F02K 9/48 60/260 |
| 7,900,436 | B2 * | 3/2011 | Greene | F02K 9/42 60/260 |
| 8,220,249 | B2 * | 7/2012 | Kimura | F02K 9/58 239/265.17 |
| 9,650,995 | B2 * | 5/2017 | Elias | F02K 9/48 |
| 9,771,897 | B2 * | 9/2017 | Soulier | F02K 9/64 |
| 11,181,076 | B2 * | 11/2021 | Weldon | F02K 9/972 |

OTHER PUBLICATIONS

Takeshi Kanda, Expander and Coolant-Bleed Cycles of Methane-Fueled Rocket Engines, 2018, Trans. Japan Soc. Aero. Space Sci, vol. 61, No. 3, pp. 106-118 (Year: 2018).*

* cited by examiner

*Primary Examiner* — Kyle Robert Thomas
(74) *Attorney, Agent, or Firm* — Lee & Hayes P.C.

(57) ABSTRACT

A rocket propulsion system that may include a supersonic rocket nozzle with a supersonic divergent section, and a heat transfer system configured to transfer heat from the supersonic rocket nozzle to a propellant where a portion of the propellant may be selectively injected, combusted, and expanded in the supersonic nozzle generating an additional thrust. In examples, the heated propellant may be used to power a pump system to feed the rocket engine.

17 Claims, 10 Drawing Sheets

AFTERBURNING TURBINE EXHAUST CYCLE (ABTEC)

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some aspects, the techniques described herein relate to a rocket propulsion system including: a supersonic rocket nozzle defined by a convergent section, a throat, and a supersonic divergent section; and a propellant injection system disposed at an annular region of the supersonic divergent section, the propellant injection system configured to inject propellant into the annular region of the supersonic divergent section, and is configured to generate thrust in following modes: an augmented thrust mode, such that augmented thrust is generated in the annular region from propellant injected into the annular region of the supersonic divergent section, and an active purge mode, such that a propellant pressure created from the propellant entering the annular region of the supersonic divergent section is greater than or equal to an annular region pressure created by other combustion sources at an injection location of the propellant injection system.

In some aspects, the techniques described herein relate to a rocket propulsion system, further including a control system for controlling the propellant injection system and activating the augmented thrust mode or active purge mode. In some aspects, the techniques described herein relate to a rocket propulsion system, wherein the propellant is a bipropellant, the propellant injection system further comprises a fuel injection system and an oxidizer injection system.

In some aspects, the techniques described herein relate to a rocket propulsion system, wherein the fuel injection system comprises a fuel manifold and the oxidizer injection system comprises an oxidizer manifold. In some aspects, the techniques described herein relate to a rocket propulsion system, wherein an injector of the oxidizer injection system and an injector of the fuel injection system are arranged such that oxidizer and fuel impinge on each other when injected.

In some aspects, the techniques described herein relate to a rocket propulsion system, wherein the propellant is injected into the annular region of the supersonic divergent section as a liquid in the augmented thrust mode, and the propellant is injected into the annular region of the supersonic divergent section as a gas in the active purge mode.

In some aspects, the techniques described herein relate to a rocket propulsion system including: a supersonic rocket nozzle defined by a convergent section, a throat, and a supersonic divergent section; and a propellant injection system disposed at a region of the supersonic divergent section, the propellant injection system configured to inject propellant into the region of the supersonic divergent section, the propellant injection system including: a first injection system disposed at a first sector of the region; a second injection system disposed at a second sector of the region; and a third injection system disposed at a third sector of the region, the first sector, the second sector, and the third sector being distributed about the supersonic divergent section; the propellant injection system configured to generate thrust in following modes: a vectored thrust mode, such that an augmented thrust is generated in a first direction from propellant injected through at least the first injection system at a purge thrust level and at least one of the second injection system, or the third injection system at an augmented thrust level, the first direction being different from an axial direction defined by the region of the supersonic divergent section; and an axial thrust mode, such that an augmented thrust is generated in the axial direction from propellant injected into the region of the supersonic divergent section.

In some aspects, the techniques described herein relate to a rocket propulsion system, the axial thrust mode further including: an augmented thrust mode, such that an augmented thrust is generated in the region from propellant injected into the region of the supersonic divergent section, or a purge thrust mode, such that a propellant pressure created from the propellant entering the region of the supersonic divergent section is greater than or equal to an region pressure created by other combustion sources at an injection location of the propellant injection system.

In some aspects, the techniques described herein relate to a method for operating a rocket engine, including: pressurizing a propellant in a pump system; directing a first portion of the propellant to a combustion chamber and passing a second portion of the propellant to a heat exchanger; transferring heat from the rocket engine to the propellant via the heat exchanger generating a heated propellant; transferring the heated propellant to a drive side of a pump of the pump system; extracting, by the pump, energy from the heated propellant; applying, by the pump, the extracted energy to pressurize the propellant in the pump system; transferring the propellant from the drive side of the pump to an injection system disposed on a supersonic nozzle of the rocket engine; and injecting, via the injection system, the propellant into the supersonic nozzle generating thrust.

In some aspects, the techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; a bipropellant injection system disposed at an annular region of the supersonic divergent section, the bipropellant injection system configured to inject fuel and oxidizer into the annular region of the supersonic divergent section; and a bipropellant pump feed system including: a fuel pump configured to pressurize the fuel, the fuel pump including a fuel pressurizing side driven by a fuel drive side; an oxidizer pump configured to pressurize the oxidizer, the oxidizer pump including an oxidizer pressurizing side driven by an oxidizer drive side; a distribution system configured to deliver a portion of the pressurized fuel from the fuel pressurizing side to the heat transfer system, from the heat transfer system to the fuel drive side, and from the fuel drive side to the bipropellant injection system, and configured to deliver a portion of the pressurized oxidizer from the oxidizer pressurizing side to the heat transfer system, from the heat transfer system to the oxidizer drive side, and from the oxidizer drive side to the bipropellant injection system.

In some aspects, the techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; and a propellant pump feed system including: a prime pump configured to pressurize the propellant, the prime pump including a prime pressurizing side driven by a prime drive side; a boost pump configured to pressurize the propellant, the boost pump including a boost pressurizing side driven by a boost drive side; a distribution system configured to deliver a portion of the pressurized propellant from the prime pressurizing side to the heat transfer system, from the heat transfer system to the prime drive side, from the prime drive side to the boost drive side, and from the boost drive side to the prime pressurizing side.

In some aspects, the techniques described herein relate to a method for operating a rocket engine, including: pressurizing a propellant with a boost pump to a boost pressure; increasing a pressure of the propellant with a prime pump to a prime pressure; directing a first portion of the propellant, at the prime pressure, to a combustion chamber and passing a second portion of the propellant to a heat exchanger; transferring heat from the rocket engine to the propellant via the heat exchanger generating a heated propellant; transferring the heated propellant to a prime drive side of the prime pump; extracting energy from the heated propellant by the prime pump; applying the extracted energy to pressurize the propellant to the prime pressure; transferring the heated propellant from the prime drive side to a boost drive side of the boost pump; extracting energy from the heated propellant by the boost pump; applying the extracted energy to pressurize the propellant to the boost pressure; and mixing the heated propellant from the boost drive side with propellant exiting the boost pump directed to the prime pump.

In some aspects, the techniques described herein relate to a method, wherein an amount of propellant directed to the injection system is based at least in part on a heat and pressure of propellant exiting the boost drive side and a heat and pressure of propellant exiting the boost pressurizing side, to avoid cavitation of the propellant in the prime pump.

In some aspects, the techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; and a bipropellant pump feed system including: a fuel prime pump configured to pressurize fuel, the fuel prime pump including a fuel prime pressurizing side driven by a fuel prime drive side; a fuel boost pump configured to pressurize the fuel, the fuel boost pump including a fuel boost pressurizing side driven by a fuel boost drive side; an oxidizer prime pump configured to pressurize oxidizer, the oxidizer prime pump including a oxidizer prime pressurizing side driven by a oxidizer prime drive side; a oxidizer boost pump configured to pressurize the oxidizer, the oxidizer boost pump including a oxidizer boost pressurizing side driven by a oxidizer boost drive side; a distribution system configured to deliver a portion of the pressurized fuel from the fuel prime pressurizing side to the heat transfer system, from the heat transfer system to the fuel prime drive side, from the fuel prime drive side to the fuel boost drive side, and from the fuel boost drive side to the fuel prime pressurizing side, and configured to deliver a portion of the pressurized oxidizer from the oxidizer prime pressurizing side to the heat transfer system, from the heat transfer system to the oxidizer prime drive side, from the oxidizer prime drive side to the oxidizer boost drive side, and from the oxidizer boost drive side to the oxidizer prime pressurizing side.

In some aspects, the techniques described herein relate to a rocket propulsion system, the distribution system further configured to selectively direct fuel from the fuel prime drive side to a fuel injection system disposed at an annular region of the supersonic divergent section, the fuel injection system configured to inject fuel into the annular region of the supersonic divergent section, and configured to selectively direct oxidizer from the oxidizer prime drive side to an oxidizer injection system disposed at the annular region of the supersonic divergent section, the oxidizer injection system configured to inject oxidizer into the annular region of the supersonic divergent section.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
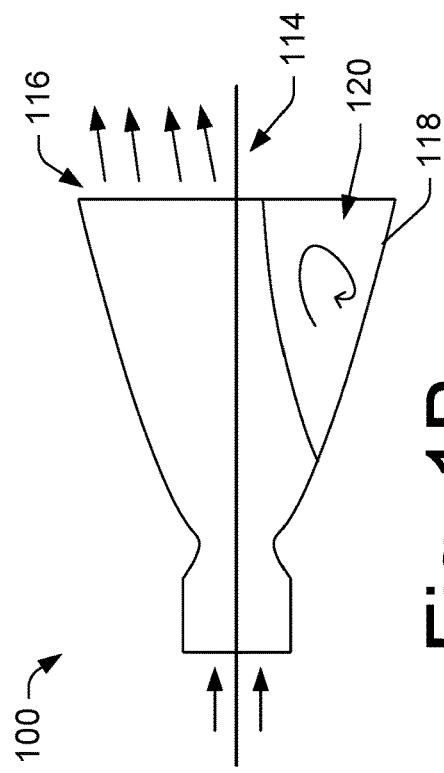
FIGS. 1A and 1B show section views of illustrative rocket engine nozzles.

This disclosure is directed to rocket engines using propellant to generate thrust. In examples, a rocket propulsion system includes: a supersonic rocket nozzle defined by a convergent section, a throat, and a supersonic divergent section; and a propellant injection system disposed at an annular region of the supersonic divergent section, the propellant injection system configured to inject propellant into the annular region of the supersonic divergent section, and is configured to generate thrust in following modes: an augmented thrust mode, such that augmented thrust is generated in the annular region from propellant injected into the annular region of the supersonic divergent section, and an active purge mode, such that a propellant pressure created from the propellant entering the annular region of the supersonic divergent section is greater than or equal to an annular region pressure created by other combustion sources at an injection location of the propellant injection system.

In examples, techniques described herein relate to a rocket propulsion system, further including a control system for controlling the propellant injection system and activating the augmented thrust mode or active purge mode. In examples, the techniques described herein relate to a rocket propulsion system, wherein the propellant is a bipropellant, the propellant injection system further comprises a fuel injection system and an oxidizer injection system.

In examples, techniques described herein relate to a rocket propulsion system, wherein the fuel injection system comprises a fuel manifold and the oxidizer injection system comprises an oxidizer manifold. In examples, the techniques described herein relate to a rocket propulsion system, wherein an injector of the oxidizer injection system and an injector of the fuel injection system are arranged such that oxidizer and fuel impinge on each other when injected.

In examples, techniques described herein relate to a rocket propulsion system, wherein the propellant is injected into the annular region of the supersonic divergent section as a liquid in the augmented thrust mode, and the propellant is injected into the annular region of the supersonic divergent section as a gas in the active purge mode.

In examples, techniques described herein relate to a rocket propulsion system, further including a valve selectively engaged and configured to control an amount of propellant injected into the annular region.

In examples, techniques described herein relate to a rocket propulsion system including: a supersonic rocket nozzle defined by a convergent section, a throat, and a supersonic divergent section; and a propellant injection system disposed at a region of the supersonic divergent section, the propellant injection system configured to inject propellant into the region of the supersonic divergent section, and is configured to generate thrust in following modes: a large thrust mode, such that a large thrust is generated in the region from propellant injected into the region of the supersonic divergent section, and a low thrust mode, such that a propellant pressure created from the propellant entering the region of the supersonic divergent section is greater than or equal to a local pressure created by other combustion sources at an injection location of the propellant injection system, resulting in a low thrust, the large thrust being greater than the low thrust.

In examples, techniques described herein relate to a rocket propulsion system, the modes further including an intermediate thrust, such that an intermediate thrust is generated in the region from propellant injected into the region of the supersonic divergent section, the intermediate thrust being greater than the low thrust and the large thrust being greater than the intermediate thrust.

In examples, techniques described herein relate to a rocket propulsion system including: a supersonic rocket nozzle defined by a convergent section, a throat, and a supersonic divergent section; and a propellant injection system disposed at a region of the supersonic divergent section, the propellant injection system configured to inject propellant into the region of the supersonic divergent section, the propellant injection system including: a first injection system disposed at a first sector of the region; a second injection system disposed at a second sector of the region; and a third injection system disposed at a third sector of the region, the first sector, the second sector, and the third sector being distributed about the supersonic divergent section; the propellant injection system configured to generate thrust in following modes: a vectored thrust mode, such that an augmented thrust is generated in a first direction from propellant injected through at least the first injection system at a purge thrust level and at least one of the second injection system, or the third injection system at an augmented thrust level, the first direction being different from an axial direction defined by the region of the supersonic divergent section; and an axial thrust mode, such that an augmented thrust is generated in the axial direction from propellant injected into the region of the supersonic divergent section.

In examples, techniques described herein relate to a rocket propulsion system, the axial thrust mode further including: an augmented thrust mode, such that an augmented thrust is generated in the region from propellant injected into the region of the supersonic divergent section, or a purge thrust mode, such that a propellant pressure created from the propellant entering the region of the supersonic divergent section is greater than or equal to an region pressure created by other combustion sources at an injection location of the propellant injection system.

In examples, techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; a propellant injection system disposed at an annular region of the supersonic divergent section, the propellant injection system configured to inject propellant into the annular region of the supersonic divergent section; and a propellant pump feed system including: a pump configured to pressurize the propellant, the pump including a pressurizing side driven by a drive side; a distribution system configured to deliver a portion of the pressurized propellant from the pressurizing side to the heat transfer system, from the heat transfer system to the drive side, and from the drive side to the propellant injection system.

In examples, techniques described herein relate to a rocket propulsion system, wherein the pump comprises a turbopump having a turbine on the drive side configured to extract energy from the portion of propellant after the portion of propellant received energy from the heat transfer system.

In examples, techniques described herein relate to a rocket propulsion system, wherein the heat transfer system is configured to cause a phase change of the propellant based on an amount of energy transferred to the propellant from the supersonic rocket nozzle or a combustion chamber.

In examples, techniques described herein relate to a rocket propulsion system, further including a second a propellant injection system disposed at a second annular region of the supersonic divergent section, the second propellant injection system configured to inject propellant into the second annular region of the supersonic divergent section.

In examples, techniques described herein relate to a method for operating a rocket engine, including: pressurizing a propellant in a pump system; directing a first portion of the propellant to a combustion chamber and passing a second portion of the propellant to a heat exchanger; transferring heat from the rocket engine to the propellant via the heat exchanger generating a heated propellant; transferring the heated propellant to a drive side of a pump of the pump system; extracting, by the pump, energy from the heated propellant; applying, by the pump, the extracted energy to pressurize the propellant in the pump system; transferring the propellant from the drive side of the pump to an injection system disposed on a supersonic nozzle of the rocket engine; and injecting, via the injection system, the propellant into the supersonic nozzle generating thrust.

In examples, techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; a bipropellant injection system disposed at an annular region of the supersonic divergent section, the bipropellant injection system configured to inject fuel and oxidizer into the annular region of the supersonic divergent section; and a bipropellant pump feed system including: a fuel pump configured to pressurize the fuel, the fuel pump including a fuel pressurizing side driven by a fuel drive side; an oxidizer pump configured to pressurize the oxidizer, the oxidizer pump including an oxidizer pressurizing side driven by an oxidizer drive side; a distribution system configured to deliver a portion of the pressurized fuel from the fuel pressurizing side to the heat transfer system, from the heat transfer system to the fuel drive side, and from the fuel drive side to the bipropellant injection system, and configured to deliver a portion of the pressurized oxidizer from the oxidizer pressurizing side to the heat transfer system, from the heat transfer system to the oxidizer drive side, and from the oxidizer drive side to the bipropellant injection system.

In examples, techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; and a propellant pump feed system including: a prime pump configured to pressurize the propellant, the prime pump including a prime pressurizing side driven by a prime drive side; a boost pump configured to pressurize the propellant, the boost pump including a boost pressurizing side driven by a boost drive side; a distribution system configured to deliver a portion of the pressurized propellant from the prime pressurizing side to the heat transfer system, from the heat transfer system to the prime drive side, from the prime drive side to the boost drive side, and from the boost drive side to the prime pressurizing side.

In examples, techniques described herein relate to a rocket propulsion system, the distribution system further including a mixing system configured to mix propellent exiting the boost drive side with propellent entering the prime pressurizing side. In examples, techniques described herein relate to a rocket propulsion system, the mixing system including one or more of a bend, a mixing vane, or an operation configured to mix propellent exiting the boost drive side with propellent entering the prime pressurizing side.

In examples, techniques described herein relate to a rocket propulsion system, the distribution system further configured to selectively direct propellant from the prime drive side to a propellant injection system disposed at an annular region of the supersonic divergent section, the propellant injection system configured to inject propellant into the annular region of the supersonic divergent section.

In examples, techniques described herein relate to a rocket propulsion system, wherein an amount of propellant directed to the injection system is based at least in part on a heat and pressure of propellant exiting the boost drive side and a heat and pressure of propellant exiting the boost pressurizing side, to avoid cavitation of the propellant in the prime pump.

In examples, techniques described herein relate to a method for operating a rocket engine, including: pressurizing a propellant with a boost pump to a boost pressure; increasing a pressure of the propellant with a prime pump to a prime pressure; directing a first portion of the propellant, at the prime pressure, to a combustion chamber and passing a second portion of the propellant to a heat exchanger; transferring heat from the rocket engine to the propellant via the heat exchanger generating a heated propellant; transferring the heated propellant to a prime drive side of the prime pump; extracting energy from the heated propellant by the prime pump; applying the extracted energy to pressurize the propellant to the prime pressure; transferring the heated propellant from the prime drive side to a boost drive side of the boost pump; extracting energy from the heated propellant by the boost pump; applying the extracted energy to pressurize the propellant to the boost pressure; and mixing the heated propellant from the boost drive side with propellant exiting the boost pump directed to the prime pump.

In examples, techniques described herein relate to a method, wherein an amount of propellant directed to the injection system is based at least in part on a heat and pressure of propellant exiting the boost drive side and a heat and pressure of propellant exiting the boost pressurizing side, to avoid cavitation of the propellant in the prime pump.

In examples, techniques described herein relate to a rocket propulsion system including: a supersonic rocket nozzle defined by a convergent section, a throat, a supersonic divergent section, and a heat transfer system configured to transfer heat from the supersonic rocket nozzle to a propellant; and a bipropellant pump feed system including: a fuel prime pump configured to pressurize fuel, the fuel prime pump including a fuel prime pressurizing side driven by a fuel prime drive side; a fuel boost pump configured to pressurize the fuel, the fuel boost pump including a fuel boost pressurizing side driven by a fuel boost drive side; an oxidizer prime pump configured to pressurize oxidizer, the oxidizer prime pump including a oxidizer prime pressurizing side driven by a oxidizer prime drive side; a oxidizer boost pump configured to pressurize the oxidizer, the oxidizer boost pump including a oxidizer boost pressurizing side driven by a oxidizer boost drive side; a distribution system configured to deliver a portion of the pressurized fuel from the fuel prime pressurizing side to the heat transfer system, from the heat transfer system to the fuel prime drive side, from the fuel prime drive side to the fuel boost drive side, and from the fuel boost drive side to the fuel prime pressurizing side, and configured to deliver a portion of the pressurized oxidizer from the oxidizer prime pressurizing side to the heat transfer system, from the heat transfer system to the oxidizer prime drive side, from the oxidizer prime drive side to the oxidizer boost drive side, and from the oxidizer boost drive side to the oxidizer prime pressurizing side.

In examples, techniques described herein relate to a rocket propulsion system, the distribution system further configured to selectively direct fuel from the fuel prime drive side to a fuel injection system disposed at an annular region of the supersonic divergent section, the fuel injection system configured to inject fuel into the annular region of the supersonic divergent section, and configured to selectively direct oxidizer from the oxidizer prime drive side to an oxidizer injection system disposed at the annular region of the supersonic divergent section, the oxidizer injection system configured to inject oxidizer into the annular region of the supersonic divergent section.

Rocket powered launch vehicles use combustion materials to generate thrust. Traditionally, a supersonic nozzle is used to expand the combustion materials from a relatively high chamber pressure to a lower exit pressure to improve efficiency of the engine. The static nature of the traditional nozzle construction limits the pressure regime where the combustion materials are efficiently expanded. However, rocket powered launch vehicles operate in vastly different atmospheric pressure regimes when used as launch vehicles and in the upper atmosphere or in space. Traditionally, a nozzle is optimized for a specific pressure altitude at the expense of operational efficiencies at other altitudes. For example, if the nozzle is optimized for launch at sea level, efficiency of the engine in the upper atmosphere will suffer since the combustion materials exit the nozzle at a much higher pressure than the surrounding pressure causing an under expanded condition. Similarly, if the nozzle is optimized for operation in the upper atmosphere where the pressure is significantly lower than sea-level, efficiency of the engine through the launch phase will suffer as the nozzle will overexpand the combustion materials causing a back pressure from the atmosphere and may cause unpredictable separation of the flow from the nozzle causing thrust direction variations and damage to the engine.

An attempt to address this has been discussed in U.S. Pat. No. 6,568,171 where additional propellent is injected into the nozzle; however, that discussion does not address how the engine is throttled or how combustion gasses are prevented from flowing back through the nozzle injectors. Backflow of hot combustion gasses through the injectors and into an uncooled manifold can lead to destruction of the engine.

Additionally, in liquid propulsion rocket engines, a defining feature of the engine is the method used to feed the propellants into the engine, commonly known as the engine cycle. As combustion device performance and weight go hand in hand with increased engine pressure there is a drive for cycles that can feed engines at high pressure. These cycles have various drawback with increased weight and/or complexity. Often, high pressure fed engines use turbomachinery to build pressure. These systems often add a large cost, complexity, and weight to the engine. Traditionally, the three cycles are grouped as 1. Pressure fed where the tanks are run at a pressure above the engine which is very simple but very heavy (often due to the required tanks); 2. Open cycle where a small percentage of the propellant (or another fluid) is heated up and driven through a turbine that powers a pump (while this cycle is reasonably simple and light, the performance suffers since the drive gas that is dumped overboard without creating useful thrust); and 3. Closed cycle where a percentage of the propellant, up to the full flow of the propellants, is heated up and driven through a turbine that powers a pump before the turbine exhaust is injected in the combustion chamber. While the closed cycle has a high a relatively high efficiency, the complexity and high pressures required offset some of that benefit. However, illustrative embodiments and techniques disclosed herein address those issues among others.

Illustrative Dual Mode Thrust

FIGS. 1A and B show section views of illustrative rocket engine nozzles. For example, FIG. 1A shows a cross section view of a traditional rocket engine 100 with a supersonic nozzle 102, having a convergent section 104, a throat 106, and a supersonic divergent section 108. In examples the traditional rocket engine 100 includes a combustion chamber 110 generating a core pressure flow 112 directed to throat 106 via the convergent section 104 and into the supersonic divergent section 108 expanding the core pressure flow 112 to an exit pressure flow 114 at the nozzle exit 116. In examples, where the exit pressure flow 114 is significantly greater than an atmospheric pressure, then the flow is under expanded and efficiency of the engine is lowered.

Figure 1B:
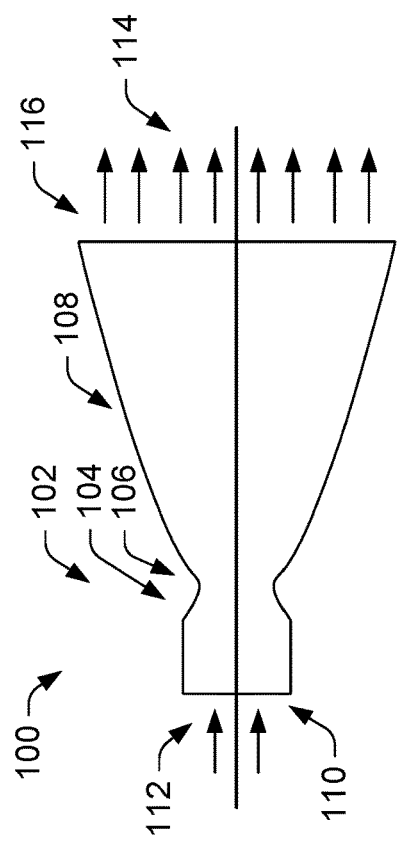

FIG. 1B shows the traditional rocket engine 100 where the exit pressure flow 114 is significantly lower than the atmospheric pressure. In this example, the exit pressure flow 114 has separated from a wall 118 of the supersonic divergent section 108, causing a detached flow zone 120 in the traditional rocket engine 100. In this situation, the flow can attach and detach unpredictably causing thrust direction variations as well as lateral forces that can cause damage to the engine.

Figure 1C:
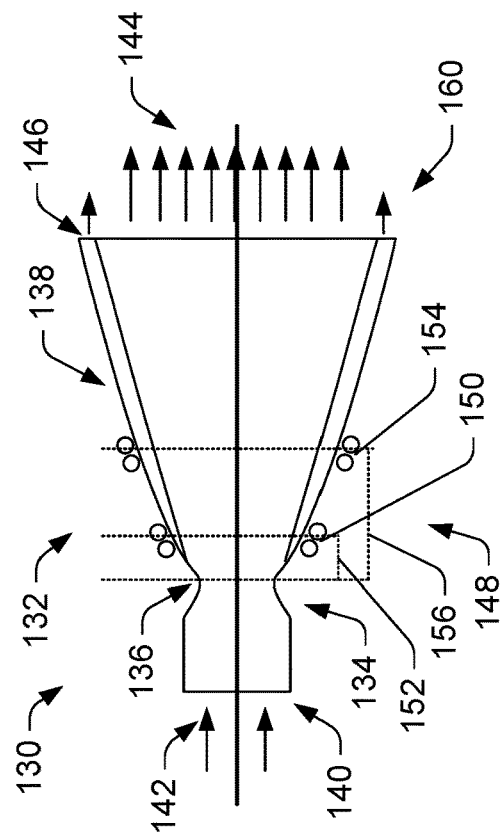
FIGS. 1C and 1D show section views of illustrative rocket engine nozzles with dual mode capabilities.

FIGS. 1C and D show section views of illustrative rocket engine nozzles with dual mode capabilities. For example, FIG. 1C shows a cross section view of a rocket engine 130 with a supersonic nozzle 132, having a convergent section 134, a throat 136, and a supersonic divergent section 138. In examples the rocket engine 130 includes a combustion chamber 140 generating a core pressure flow 142 directed to throat 136 via the convergent section 134 and into the supersonic divergent section 138 expanding the core pressure flow 142 to an exit pressure flow 144 at the nozzle exit 146.

FIG. 1C also shows a propellent injection system 148 with an injection site 150 disposed on the supersonic divergent section 138 at a distance 152 from the throat 136. Additionally or alternatively, the propellent injection system 148 may include a second injection site 154 disposed on the supersonic divergent section 138 at a distance 156 from the throat 136. In examples, there are additional injection sites. In examples, the propellent injection system 148 is configured to inject propellant into the annular region of the supersonic divergent section 138. In examples, the annular region is symmetric. In examples, the annular region is asymmetric. Additionally or alternatively, in examples, the injection sites are evenly distributed around the supersonic divergent nozzle. In examples, the injection sites are clustered together. In examples, the injection sites are distributed substantially in a linear, e.g., strip, configuration that extends from a location on the nozzle in a direction substantially parallel to an axis of the engine. In examples, the injection sites are distributed substantially in a linear, e.g., strip, configuration that extends from a location on the nozzle in a direction substantially skew to an axis of the engine.

In examples, the propellent injection system 148 is configured to generate thrust in various modes. For example, the propellent injection system 148 may operate in an augmented thrust mode, such that augmented thrust is generated in the annular region from propellant injected into the annular region of the supersonic divergent section 138. In examples, the propellent injection system 148 may operate in active purge mode, such that a propellant pressure created from the propellant entering the annular region of the supersonic divergent section 138 is greater than or equal to an annular region pressure created by other combustion sources, for example, from the core pressure flow 142, at the injection site 150, for example, at a distance 152 from the throat. In examples, pressure at the second injection site 154 may be based at least upon the core pressure flow 142 and the mode the propellent injection system 148 is operating in.

The pressure at the distance 152 or distance 156 may be based at least in part on the core pressure flow 142, the size of the throat 136, and the shape of the supersonic divergent section 138. Often the pressure is derived from the area ratio of the cross-sectional area of throat and the cross-sectional area of the supersonic divergent section at the distance from the throat since the supersonic divergent section is geometrically static. Additionally or alternatively, the pressure at the station may be affected by a state of the flow, for example, attached or detached, and/or any additional pressure sources, for example, an upstream propellant injection.

FIG. 1C also shows an augmented exit pressure flow 158 in addition to exit pressure flow 144. In examples, the propellent injection system 148 may be configured to inject propellant into the supersonic divergent section 138 at the injection site 150 and/or the second injection site 154. In examples, the augmented exit pressure flow 158 may be relatively lower velocity with relatively higher mass flow when compared to the exit pressure flow 144 with overall relatively moderate to high efficiency over the operational envelope.

Figure 1D:
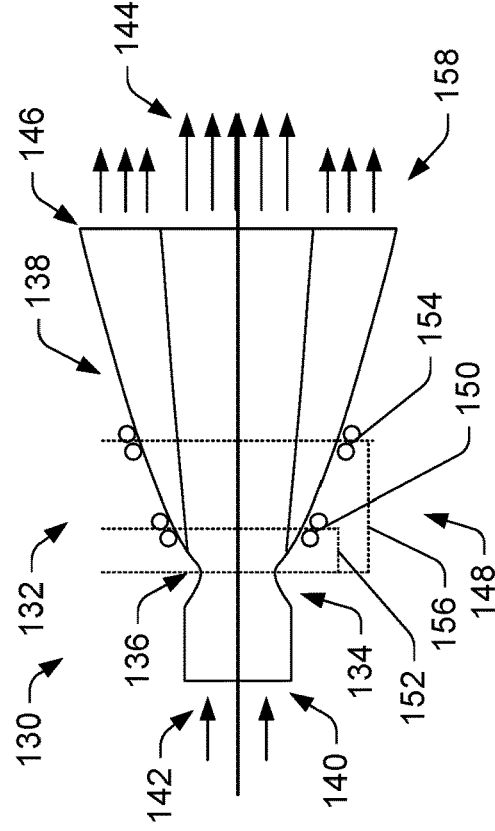

FIG. 1D shows an example, where the rocket engine 130 is operating in active purge mode, such that a propellant pressure created from the propellant entering the annular region of the supersonic divergent section 138 is greater than or equal to an annular region pressure created by other combustion sources, for example, from the core pressure flow 142, at the injection site 150, for example, at a distance 152 from the throat. In examples, pressure at the second injection site 154 may be based at least upon the core pressure flow 142 and the mode the propellent injection system 148 is operating in. The propellent injected may result in an active purge exit pressure flow 160.

In examples, the active purge exit pressure flow 160 may be relatively lower velocity with relatively much smaller mass flow when compared to the exit pressure flow 144 with overall relatively moderate to high efficiency over the operational envelope.

Additionally or alternatively, in examples, the rocket engine 130 may include a control system for controlling the propellant injection system and activating the augmented thrust mode, the active purge mode, or modes of varying thrust levels in-between. In examples, the control system may activate the injection sites at the injection site 150 and/or the second injection site 154, independently or in coordination with each other, to increase or decrease the overall thrust of the rocket engine 130. In examples, one or more valves may be selectively engaged to control the amount and distribution of propellant injected into the annular region. In examples, the valves are actuated to control what injectors are activated. In examples, selective activation of injectors control a local heat load on the engine. In examples, selective activation of injectors control a thrust vectoring control of an engine.

Additionally or alternatively, in examples, the rocket engine 130 may include a bipropellant where the propellent injection system 148 includes a fuel injection system and an oxidizer injection system. In examples, the fuel injection system includes a fuel manifold and the oxidizer injection system includes an oxidizer manifold. In examples, the manifolds are configured to deliver the propellants to an annular section of the supersonic divergent section 138. In examples, one or more injectors of the oxidizer injection system and injectors of the fuel injection system are arranged such that oxidizer and fuel impinge on each other when injected into the supersonic divergent section 138.

Additionally or alternatively, in examples, the propellent injection system 148 is configured such that the propellant is injected into the annular region of the supersonic divergent section as a liquid in the in the augmented thrust mode, and the propellant is injected into the annular region of the supersonic divergent section as a gas in the active purge mode.

Additionally or alternatively, in examples, the propellent injection system 148 is configured such that the propellant is injected into the annular region of the supersonic divergent section as a supercritical fluid in the in the augmented thrust mode, and the propellant is injected into the annular region of the supersonic divergent section as a less gaseous supercritical fluid in the active purge mode.

Illustrative Directional Thrust

Figure 2A:
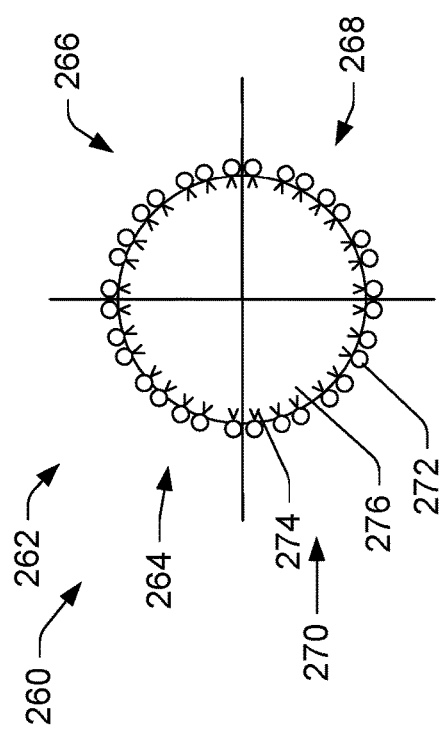
FIGS. 2A-D show section views of illustrative rocket engine nozzles with thrust vectoring capabilities.

FIGS. 2A-D show section views of illustrative rocket engine nozzles with thrust vectoring capabilities. For example, FIG. 2A shows a cross section view of a rocket engine 230 with a supersonic nozzle 232, having a convergent section 234, a throat 236, and a supersonic divergent section 238. In examples the rocket engine 230 includes a combustion chamber 240 generating a core pressure flow 242 directed to throat 236 via the convergent section 234 and into the supersonic divergent section 238 expanding the core pressure flow 242 to an exit pressure flow 244 at the nozzle exit 246.

FIG. 2A also shows a propellent injection system 248 with an injection site 250 disposed on the supersonic divergent section 238 at a distance 252 from the throat 236. Additionally or alternatively, the propellent injection system 248 may include a second injection site 254 disposed on the supersonic divergent section 238 at a distance 256 from the throat 236. In examples, the propellent injection system 248 is configured to inject propellant into the annular region of the supersonic divergent section 238. In examples, the propellent injection system 248 is configured to generate thrust in various modes. For example, the propellent injection system 248 may operate in an augmented thrust mode, such that augmented thrust is generated in the annular region from propellant injected into the annular region of the supersonic divergent section 238. In examples, the propellent injection system 248 may operate in active purge mode, such that a propellant pressure created from the propellant entering the annular region of the supersonic divergent section 238 is greater than or equal to an annular region pressure created by other combustion sources, for example, from the core pressure flow 242, at the injection site 250, for example, at a distance 252 from the throat. In examples, pressure at the second injection site 254 may be based at least upon the core pressure flow 242 and the mode the propellent injection system 248 is operating in.

Additionally or alternatively, the propellent injection system 248 may include annular sectional control over the injection of propellant. For example, the FIG. 2A shows a line demarking a transverse sectional view 260.

FIG. 2A also shows an augmented exit pressure flow 258 in addition to exit pressure flow 244. In examples, the propellent injection system 248 may be configured to inject propellant into the supersonic divergent section 238 at the injection site 250 and/or the second injection site 254. In examples, the augmented exit pressure flow 258 may be relatively lower velocity with relatively higher mass flow when compared to the exit pressure flow 244 with overall relatively moderate to high efficiency over the operational envelope.

Additionally or alternatively, in examples, the rocket engine 230 operates in active purge mode, such that a propellant pressure created from the propellant entering the annular region of the supersonic divergent section 238 is greater than or equal to an annular region pressure created by other combustion sources, for example, from the core pressure flow 242, at the injection site 250, for example, at a distance 252 from the throat. In examples, pressure at the second injection site 254 may be based at least upon the core pressure flow 242 and the mode the propellent injection system 248 is operating in. The propellent injected may result in an active purge exit pressure flow.

Figure 2B:
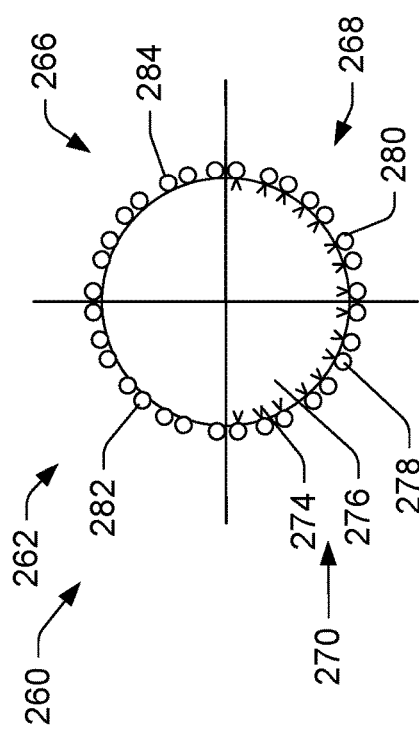

FIG. 2B shows the transverse sectional view 260. In examples, the annular sector 262 may be divided into quadrants. For example, annular sector 262 may include a first sector 264, a second sector 266, a third sector 268, and a fourth sector 270 and may be distributed around the annular section of the supersonic divergent section 238. In examples, a quadrant may include on or more injection sites 272. In examples, an injection site 272 may be configured to inject a propellant 274 into the annular region 276 of the supersonic divergent section 238. In examples, the injection of propellants may cause a thrust to be created. In examples, where one quadrant generates a greater thrust than another quadrant, an asymmetric thrust may be generated.

While four quadrants are shown in FIG. 2B, this disclosure contemplates more or fewer annular sections. Additionally or alternatively, in examples, the injection sites of the annular sections may be spaced from an adjacent annular section, may overlap a portion of the adjacent annular section, and/or combinations thereof. Additionally or alternatively, in examples, injection sites may be disposed in one annular section, but not another.

Figure 2C:
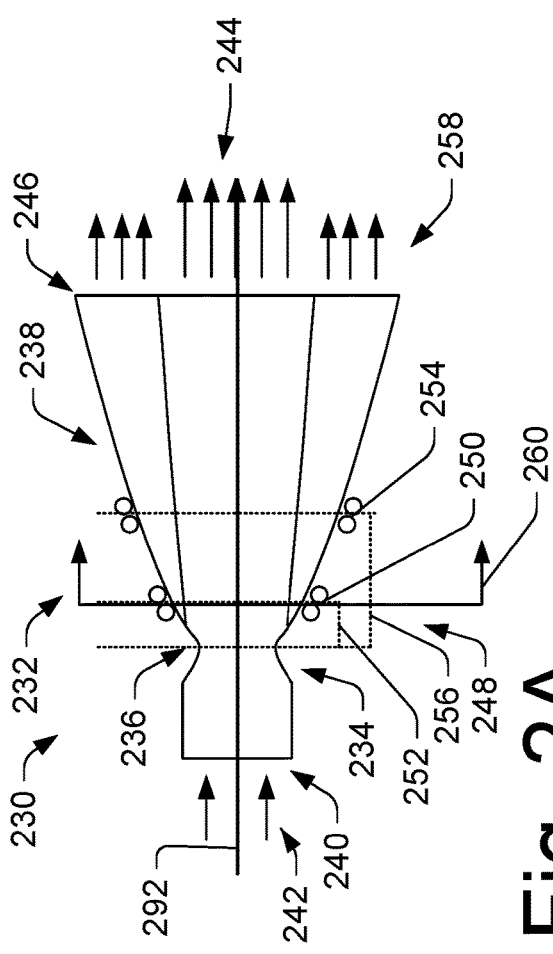
Figure 2D:
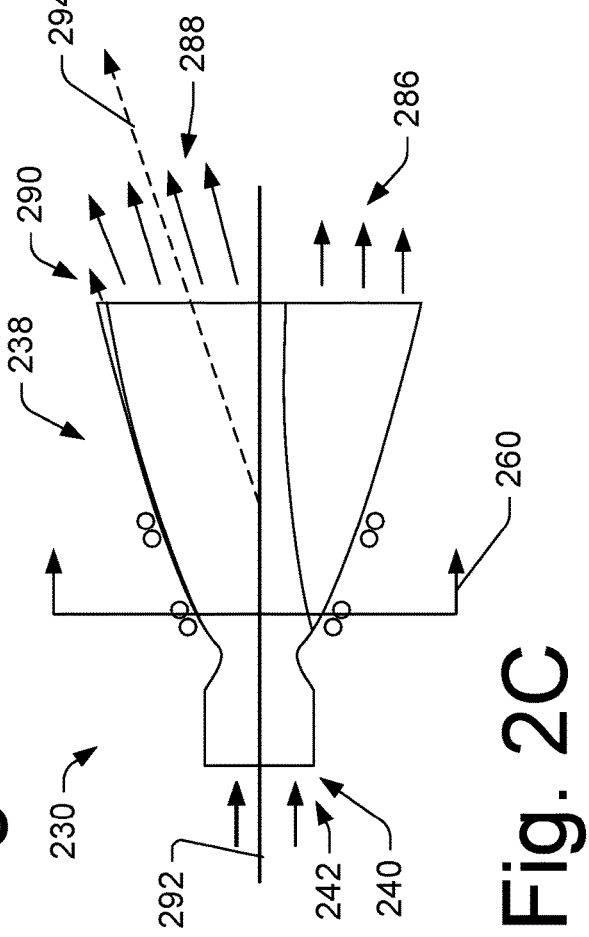

FIGS. 2C and D show an example where asymmetric thrust is created by rocket engine 230. In this example, propellant is injected into the supersonic divergent section 238 at some of the injection sites 272. In this example, an augmented exit pressure flow 286 augments the exit pressure flow 288 from the core pressure flow 242. In examples, one or more of the injection sites 272 may be in an active purge mode generating an active purge exit pressure flow 290. FIG. 2D the transverse sectional view 260 of the annular sector 262 where the injection sites 272 of the third sector 268 and fourth sector 270 are active, for example, injection site 278 and injection site 280. In examples, the injection sites 272 of the first sector 264 and the second sector 266 are inactive or are in active purge mode, for example, injection site 282 and injection site 284. In examples, where the injection sites 272 of the first sector 264 and the second sector 266 are in active purge mode, the exit pressure flow 288 may be directed away from an axis of the rocket engine 230. For example, the rocket engine 230 may have an engine axis 292 defined by the center line of the rocket engine 230 centered in the throat 236 and the nozzle exit 246. In examples, normal operation of the rocket engine 230 causes the total thrust generated by the exit pressure flow 244 and the augmented exit pressure flow 258 or active purge thrust to be directed relatively parallel to the engine axis 292. In examples, where directional thrust is desired, the total thrust generated by the exit pressure flow exit pressure flow 288, the augmented exit pressure flow 286, and the active purge exit pressure flow 290 to be directed towards direction 294. In examples, the difference between the engine axis 292 and the direction 294 depends on the core pressure flow 242 relative to the augmented exit pressure flow 286, the active purge exit pressure flow 290, and the exit pressure flow 288. In examples, the propellent injection system 248 can be tailored or adjusted to impart a desired direction and magnitude of the total thrust.

Additionally or alternatively, in examples, one or more of the annular sectors 262 may be in active purge or augmentation mode. The number of the annular sectors 262 that are in active purge verses the number of annular sectors 262 that are in augmentation mode may determine the overall thrust and or direction of the directional thrust. In examples, the direction of the thrust may be considered a vector with a magnitude and direction. In examples, a greater number of injection sites 272 in active purge mode may reduce the overall magnitude of the thrust, but may increase the deviation of the thrust direction from the central axis of the engine.

Additionally or alternatively, the annular sector 262 may comprise two sections. In example, the two sectors may be used to provide directional thrust in at least two directions away from the engine axis 292. In examples, the two sectors are symmetrically distributed about the annular sector 262. In examples, the two sectors are asymmetrically distributed about the annular sector 262

In examples, the annular sector 262 includes three sectors. For example, three sectors may be used to provide directional thrust in two dimensions. In examples, the three sectors provide directional thrust in two dimensions with thrust component vectors parallel and perpendicular to the engine axis 292. In examples, the perpendicular thrust component vector may be controlled to be directed 360 degrees around the engine axis 292.

In examples, the injection sites may be disposed around the annular sector 262 or may be localized to a region focused in a sector of the annular sector 262. In examples, the injection sites form a patch and/or strip along the supersonic divergent section 238.

Illustrative Afterburning Turbine Cycle Engine

Figure 3:
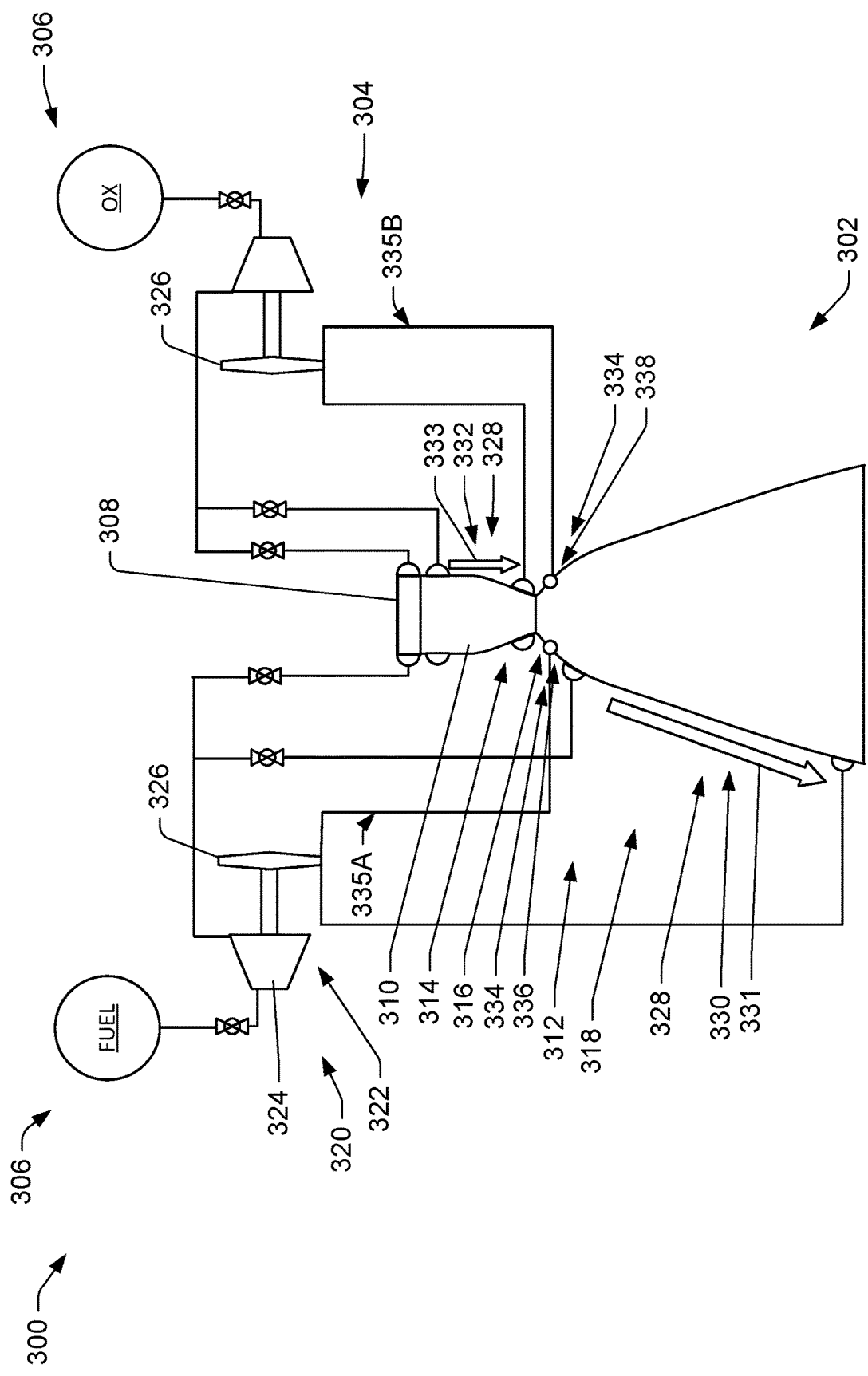
FIG. 3 shows a schematic view of an illustrative afterburning turbine cycle engine.

FIG. 3 shows a schematic view of an illustrative afterburning turbine cycle engine. FIG. 3 shows rocket propulsion system 300. In examples, rocket propulsion system 300 includes an engine 302, a propellant distribution system 304, and a propellant source 306. In examples, the engine 302 includes an injector 308 coupled to a combustion chamber 310, coupled to a supersonic rocket nozzle 312 having a convergent section 314, a throat 316, a supersonic divergent section 318. In examples, the distribution system 304 includes a propellant pump feed system 320 including a pump 322 that includes a pressurizing side 324 driven by a drive side 326 configured to pressurize a propellant in the pressurizing side 324 by extracting energy from a driving medium on the drive side 326. In examples, the driving medium may be a propellant or other fluid including a liquid and/or gas medium. In examples, the driving medium may be electricity powering an electrical drive of the pump. In examples, the distribution system 304 includes piping configured to connect system components and transfer propellant therebetween. In examples, the distribution system 304 includes valves configured to control the flow of propellant through the system. In examples, the valves may be configured to open and close in a full or partial manner. For example, a valve may be opened partially and/or adjusted and used to throttle a movement of a working medium, for example, propellant or driving medium. The distribution system 304 can include fuel side distribution elements and oxidizer side distribution elements, as shown in FIG. 3. On the fuel side, the portion of the distribution system 304 coupled between the fuel drive side 326 (at left) and the fuel portion of the injection system 334 (at left) can be referred to as a fuel turbine exhaust feed system 335A. On the oxidizer side, the portion of the distribution system 304 coupled between the oxidizer drive side 326 (at right) and the oxidizer portion of the injection system 334 (at right) can be referred to as an oxidizer turbine exhaust feed system 335B.

In examples, the rocket propulsion system 300 includes a heat exchanger 328 coupled to combustion chamber and or nozzle configured to cool the structure and transfer heat to the propellant. In examples, the heat exchanger may be disposed in or on a portion of the engine 302 that generates heat, for example, the combustion chamber 310 and/or the supersonic rocket nozzle 312. In examples, the heat exchanger 328 is configured to extract heat from the engine 302 and transfer it to a working medium, for example, a propellant and/or driving medium. In examples, the heat exchanger 328 is configured to extract enough heat from the engine 302 and to the working medium, to cool the engine 302 below a desired temperature threshold while the engine 302 is operating. In examples, the heat exchanger 328 is configured to extract enough heat from the engine 302 and to the working medium, to change a phase of the working medium. For example, if the working medium is a propellant in liquid form, the heat exchanger 328 transfers enough heat to the liquid propellant to cause the propellant to change from a liquid to a gas or a more gaseous supercritical fluid.

In examples, the heat exchanger 328 may be integrated into or attached to a single or multiple parts of the engine 302. FIG. 3 shows an example, where a bipropellant propellant system is used. In this example, the heat exchanger 328 may be separate for each component of the bipropellant. For example, the heat exchanger 328 may include a fuel heat exchanger 330 and an oxidizer heat exchanger 332. In this example, the fuel heat exchanger 330 is integrated into the supersonic divergent section 318 while the oxidizer heat exchanger 332 is integrated into the combustion chamber 310. In other examples, the oxidizer heat exchanger 332 and the fuel heat exchanger 330 may be switched. In other examples, the oxidizer heat exchanger 332 and the fuel heat exchanger 330 may both be located in in the supersonic divergent section 318 or the combustion chamber 310. In other examples, the heat exchanger 328 may be heated by a separate system, for example, a gas generator. In examples, the propellant may flow in a direction through the heat exchanger 328. For example, arrow 331 and arrow 333 indicate a general direction that a propellant may flow and pick up heat along the way. In examples, the heat exchanger 328 may comprise a manifold with channels, pipes, or other configurations. In examples, the heat exchanger 328 may wrap around the supersonic rocket nozzle 312 and/or the combustion chamber 310 and/or a portion thereof.

In examples, the driving medium is generated by combusting the propellant. In examples, the propellant is a mono propellant. In examples, the propellent is a bipropellant. For example, a fuel and an oxidizer may be combined to generate a driving gas that contains energy that is extracted by the turbine.

In examples, the rocket propulsion system 300 includes an injection system 334. For example, the injection system 334 may be disposed in the supersonic divergent section 318 and configured to inject the working medium into the supersonic divergent section 318 after the working medium has had energy extracted from it by the drive side 326 of the pump 322. In examples, the where the rocket propulsion system 300 is a bipropellant system, the injection system 334 may include a fuel injector 336 and an oxidizer injector 338. In examples, the fuel injector 336 and the oxidizer injector 338 are configured to inject into the supersonic divergent section 318 such that the fuel and oxidizer injected impinge with each other creating an augmented thrust in the engine 302.

Figure 4:
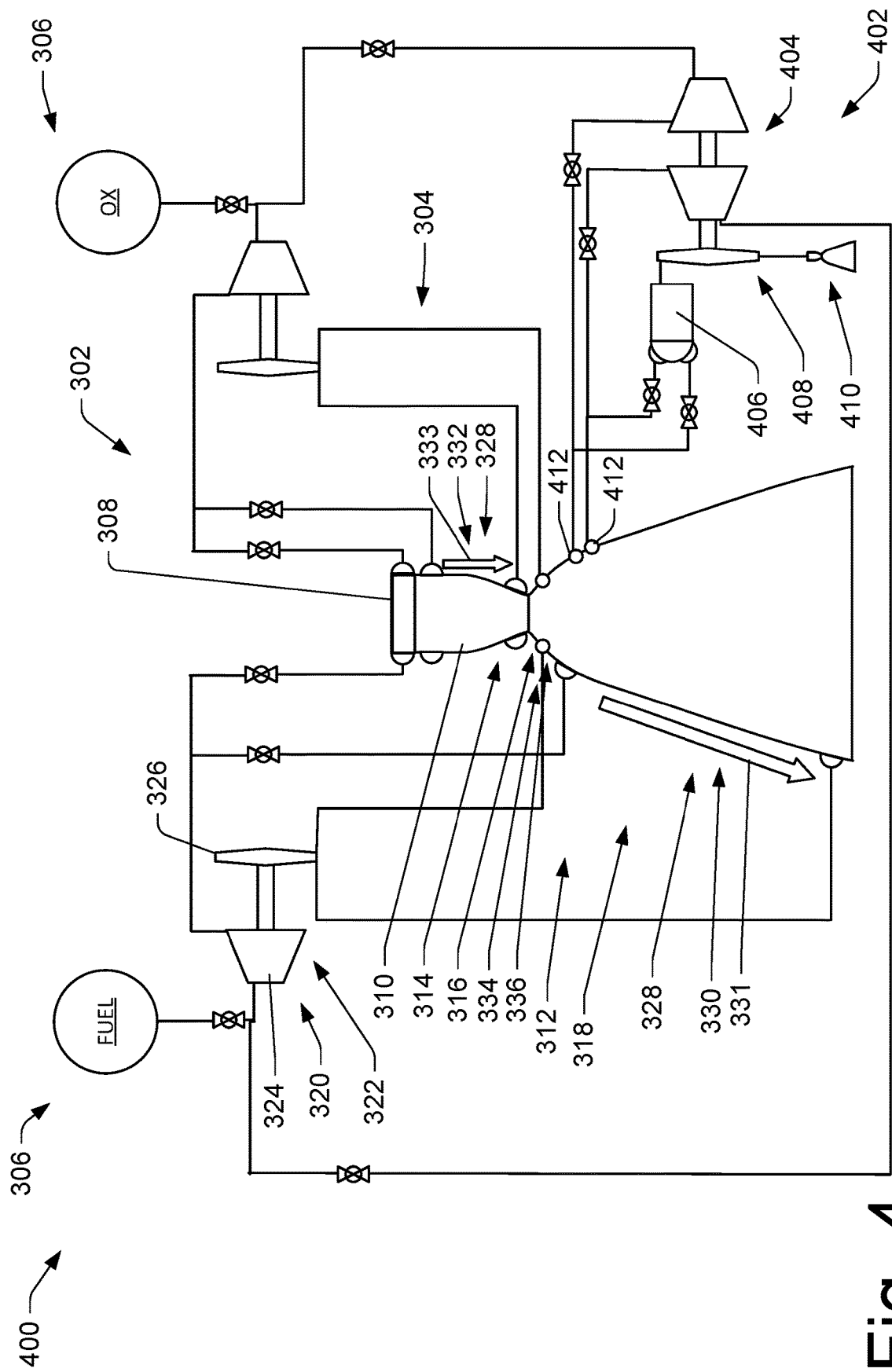
FIG. 4 shows a schematic view of an illustrative afterburning turbine cycle engine with dual mode capabilities.

FIG. 4 shows a schematic view of an illustrative afterburning turbine cycle engine with dual mode capabilities. For example, FIG. 4 shows rocket propulsion system 400 with similar components to the rocket propulsion system 300 with added capabilities. For example, the rocket propulsion system 400 includes an augmented thrust mode controllable independently of operation of the core of the engine 302. In examples, the augmented thrust mode is enabled by augmented thrust system 402. In examples, the augmented thrust system 402 includes a propellant supply. In examples, the propellant supply may be propellant source 306. In examples, the propellant supply may be separate from the propellant source 306.

FIG. 4 shows an example, where the augmented thrust system 402 is powered by a pump system 404. In examples, the pump system 404 includes a gas generator 406 powering a turbine 408 that pressurizes the propellant. The exhaust from the turbine 408 may be dumped overboard or expelled from the rocket propulsion system 400 via a nozzle 410. In examples, the exhaust from the turbine 408 may be injected into the divergent section of the nozzle near the exit of the nozzle. In examples, the pressurized propellant is injected into supersonic divergent section 318 at injector 412. In examples, the propellant system may be a bipropellant system. In bipropellant based examples, the propellant may be separated into a fuel side system and an oxidizer side system. In examples, the pressurized fuel and oxidizers are injected into the supersonic divergent section 318 such that they impinge on each other causing a combustion that generates an augmentation thrust.

Illustrative Boost Injection Turbine Exhaust Cycle Engine

Figure 5:
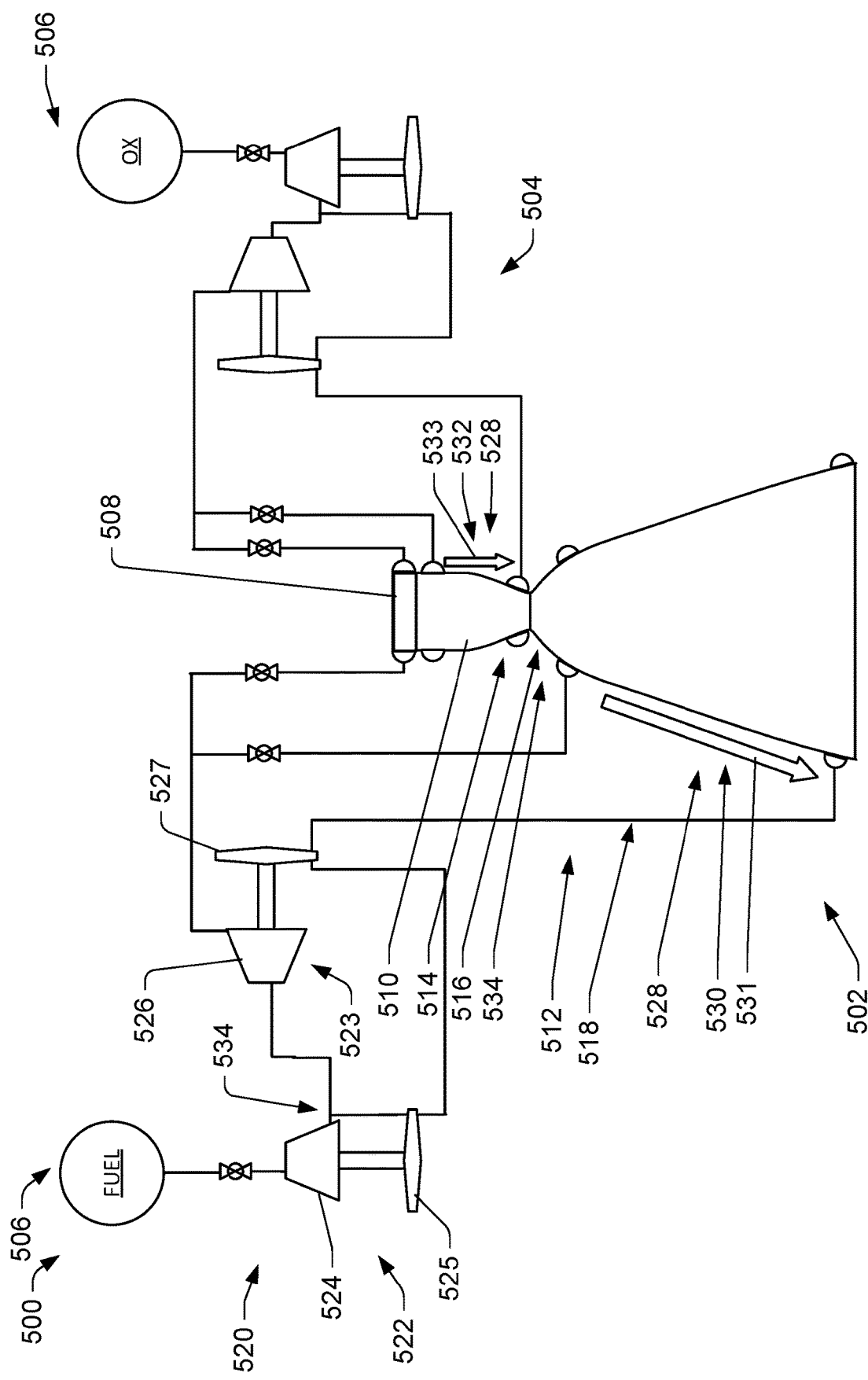
FIG. 5 shows a schematic view of an illustrative boost injection turbine exhaust cycle engine.

FIG. 5 shows a schematic view of an illustrative boost injection turbine exhaust cycle engine. For example, FIG. 5 shows rocket propulsion system 500. In examples, rocket propulsion system 500 includes an engine 502, a propellant distribution system 504, and a propellant source 506. In examples, the engine 502 includes an injector 508 coupled to a combustion chamber 510, coupled to a supersonic rocket nozzle 512 having a convergent section 514, a throat 516, a supersonic divergent section 518. In examples, the distribution system 504 includes a propellant pump feed system 520 including a boost pump 522 and a prime pump 523. In examples, the boost pump 522 includes a boost pressurizing side 524 driven by a boost drive side 525 configured to pressurize a propellant in the boost pressurizing side 524 by extracting energy from a driving medium on the boost drive side 525. In examples, the prime pump 523 includes a prime pressurizing side 526 driven by a prime drive side 527 configured to pressurize a propellant in the prime pressurizing side 526 by extracting energy from a driving medium on the prime drive side 527.

In examples, the driving medium may be a propellant or other fluid including a liquid and/or gas medium. In examples, the driving medium may be electricity powering an electrical drive of the pump. In examples, the distribution system 504 includes piping configured to connect system components and transfer propellant therebetween. In examples, the distribution system 504 includes valves configured to control the flow of propellant and/or orifices calibrated to meter the flow through the system. In examples, the valves may be configured to open and close in a full or partial manner. For example, a valve may be opened partially and/or adjusted and used to throttle a movement of a working medium, for example, propellant or driving medium.

In examples, the rocket propulsion system 500 includes a heat exchanger 528 coupled to combustion chamber and or nozzle configured to cool the structure and transfer heat to the propellant. In examples, the heat exchanger may be disposed in or on a portion of the engine 502 that generates heat, for example, the combustion chamber 510 and/or the supersonic rocket nozzle 512. In examples, the heat exchanger 528 is configured to extract heat from the engine 502 and transfer it to a working medium, for example, a propellant and/or driving medium. In examples, the heat exchanger 528 is configured to extract enough heat from the engine 502 and to the working medium, to cool the engine 502 below a desired temperature threshold while the engine 502 is operating. In examples, the heat exchanger 528 is configured to extract enough heat from the engine 502 and to the working medium, to change a phase of the working medium. For example, if the working medium is a propellant in liquid form, the heat exchanger 528 transfers enough heat to the liquid propellant to cause the propellant to change from a liquid to a gas or a more gaseous supercritical fluid.

In examples, the heat exchanger 528 may be integrated into or attached to a single or multiple parts of the engine 502. FIG. 5 shows an example, where a bipropellant propellant system is used. In this example, the heat exchanger 528 may be separate for each component of the bipropellant. For example, the heat exchanger 528 may include a fuel heat exchanger 530 and an oxidizer heat exchanger 532. In this example, the fuel heat exchanger 530 is integrated into the supersonic divergent section 518 while the oxidizer heat exchanger 532 is integrated into the combustion chamber 510. In other examples, the oxidizer heat exchanger 532 and the fuel heat exchanger 530 may be switched. In other examples, the oxidizer heat exchanger 532 and the fuel heat exchanger 530 may both be located in in the supersonic divergent section 518 or the combustion chamber 510. In other examples, the heat exchanger 528 may be heated by a separate system, for example, a gas generator. In examples, the propellant may flow in a direction through the heat exchanger 528. For example, arrow 531 and arrow 533 indicate a general direction that a propellant may flow and pick up heat along the way. In examples, the heat exchanger 528 may comprise a manifold with channels, pipes, or other configurations. In examples, the heat exchanger 528 may wrap around the supersonic rocket nozzle 512 and/or the combustion chamber 510 and/or a portion thereof.

Figure 6:
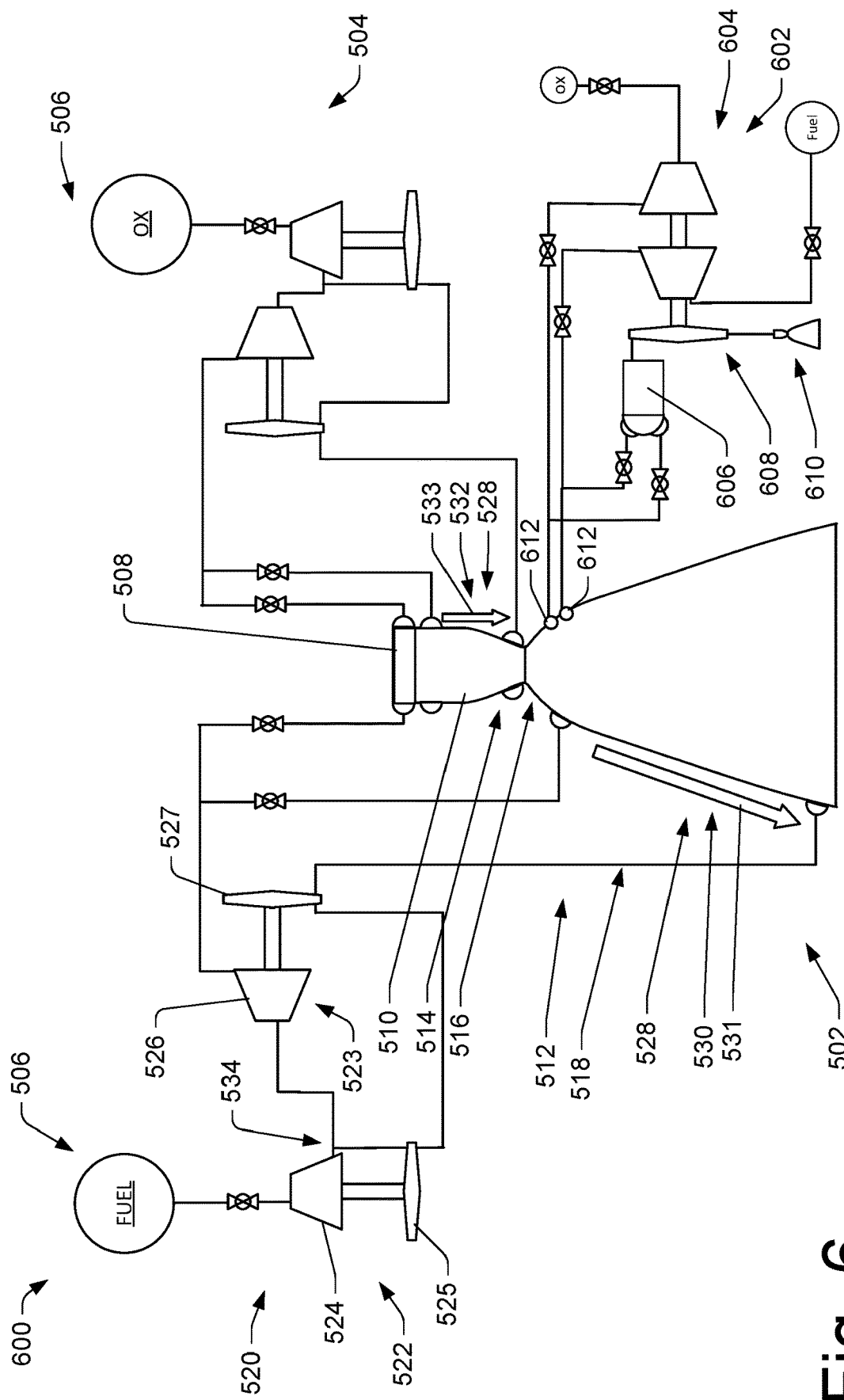
FIG. 6 shows a schematic view of an illustrative boost injection turbine exhaust cycle engine with dual mode capabilities.

FIG. 6 shows a schematic view of an illustrative boost injection turbine exhaust cycle engine with dual mode capabilities. For example, FIG. 6 shows rocket propulsion system 600 with similar components to the rocket propulsion system 500 with added capabilities. For example, the rocket propulsion system 600 includes an augmented thrust mode controllable independently of operation of the core of the engine 502. In examples, the augmented thrust mode is enabled by augmented thrust system 602. In examples, the augmented thrust system 602 includes a propellant supply. In examples, the propellant supply may be propellant source 506. In examples, the propellant supply may be separate from the propellant source 506.

FIG. 6 shows an example, where the augmented thrust system 602 is powered by a pump system 604. In examples, the pump system 604 includes a gas generator 606 powering a turbine 608 that pressurizes the propellant. The exhaust from the turbine 608 may be dumped overboard or expelled from the rocket propulsion system 600 via a nozzle 610. In examples, the pressurized propellant is injected into supersonic divergent section 518 at injector 612. In examples, the propellant system may be a bipropellant system. In bipropellant based examples, the propellant may be separated into a fuel side system and an oxidizer side system. In examples, the pressurized fuel and oxidizers are injected into the supersonic divergent section 518 such that they impinge on each other causing a combustion that generates an augmentation thrust.

Figure 7:
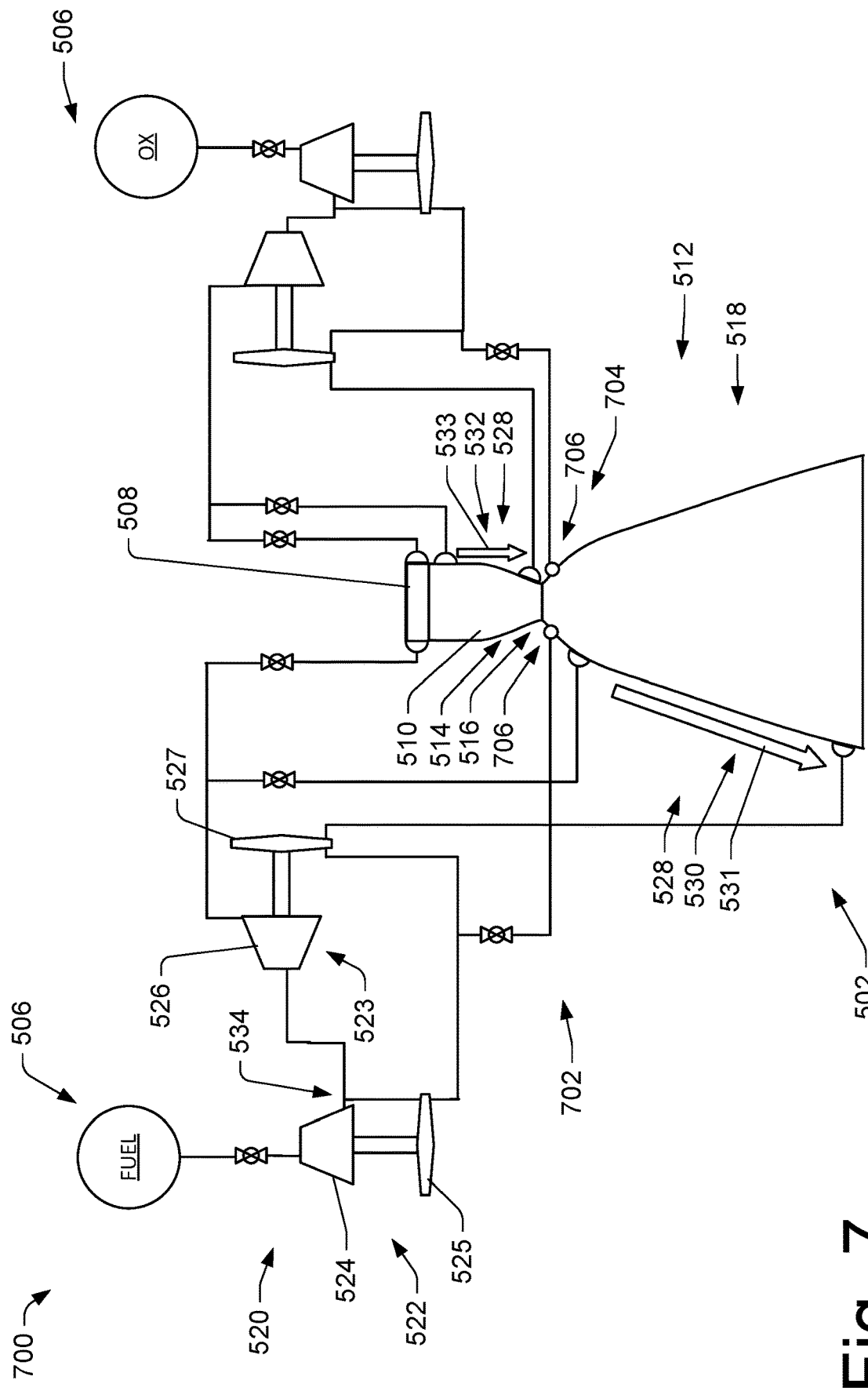
FIG. 7 shows a schematic view of another illustrative boost injection turbine exhaust cycle engine with dual mode capabilities.

FIG. 7 shows a schematic view of another illustrative boost injection turbine exhaust cycle engine with dual mode capabilities. For example, FIG. 7 shows rocket propulsion system 700 with similar components to the rocket propulsion system 500 with added capabilities. For example, the rocket propulsion system 700 includes an augmented thrust mode controllable independently of operation of the core of the engine 502. In examples, the augmented thrust mode is enabled by augmented thrust system 702. In examples, the augmented thrust system 702 includes a propellant supply. In examples, the propellant supply may be propellant source 506. In examples, the propellant supply may be separate from the propellant source 506.

FIG. 7 shows an example, where the augmented thrust system 702 is powered by a propellant pump feed system 520. In examples, a portion of the propellant may be diverted after exiting the prime drive side 527 to an injection system 704. In examples, the pressurized propellant is injected into supersonic divergent section 518 at injector 706. In examples, the propellant system may be a bipropellant system. In bipropellant based examples, the propellant may be separated into a fuel side system and an oxidizer side system. In examples, the pressurized fuel and oxidizers are injected into the supersonic divergent section 518 such that they impinge on each other causing a combustion that generates an augmentation thrust.

In examples, the system may vary the amount of pressurized propellant and/or the amount of thermal energy in the pressurized propellant diverted the prime drive side 527 and the boost drive side 525 based on thermal considerations. For example, in some operating conditions, it may be desirable to remove energy from the driving medium, e.g., the pressurized propellant, prior to the boost pump 522 or entering the prime pressurizing side 526. In examples, this reduces a chance of cavitation in the prime pressurizing side 526.

Illustrative Processes and Techniques

Figure 8:
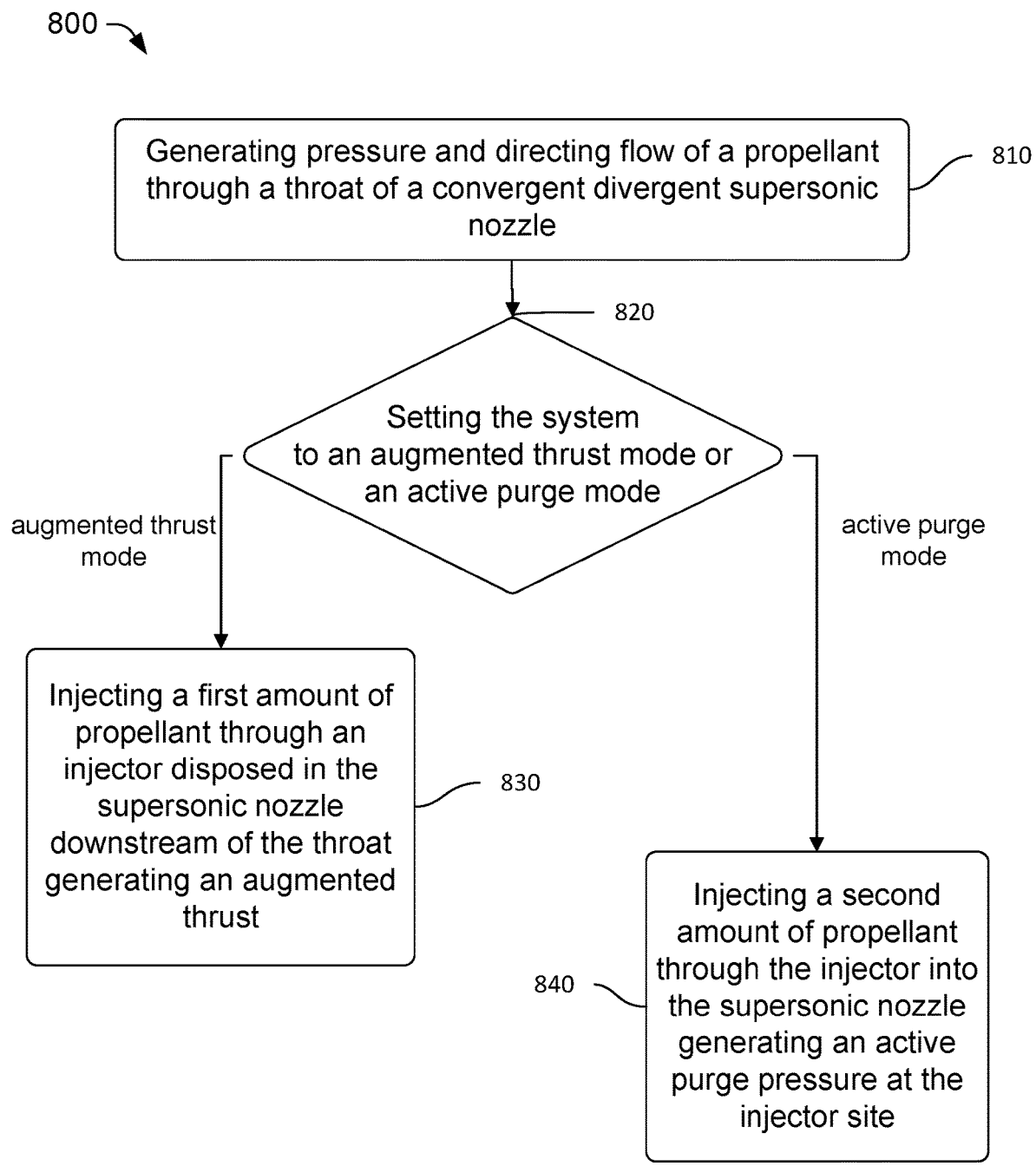
FIG. 8 is a flowchart of an example method for operating a rocket engine.

FIG. 8 is a flowchart of an example technique 800 for operating an illustrative dual mode thruster. While examples are discussed using features discussed with respect to FIGS. 1C-2D, the processes and techniques discussed herein are not limited to those examples.

In examples, at operation 810, the system generates pressure and directs flow of a propellant through a throat of a convergent divergent supersonic nozzle. In examples, the flow of propellant through the throat is considers a flow from the core of the engine, for example, from a combustion chamber.

At operation 820, the system is set to an augmented thrust mode or an active purge mode. When set in augmented thrust mode, the technique continues to operation 930. When set in active purge mode, the technique continues to operation 940.

At operation 830, the system injects a first amount of propellant through an injector disposed in the supersonic nozzle downstream from the throat and into the supersonic divergent section. The injected propellant generates an augmented thrust in the divergent supersonic nozzle increasing the thrust of the system. In examples, the first amount of propellant injected into the nozzle is based at least on a desired level of augmented thrust. In examples, the propellant may be in a liquid and/or gaseous state, for example a supercritical fluid.

At operation 840, the system injects a second amount of propellant through the injector. The injected propellant generates an active purge pressure. In examples, the active purge pressure is greater that the local pressure of the flow in the nozzle. In examples, the second amount of propellant may be in a liquid and/or gaseous state. In examples, the first amount of propellant is greater than the second amount of propellant. In examples, the second amount of propellant is based generating a pressure that is slightly higher than the local pressure within the nozzle generated by the upstream flow.

Additionally or alternatively, while the above example discusses propellant, this disclosure contemplates the system using a bipropellant system, where fuel and oxidizer propellants are used and delivered by separate systems. In examples, the fuel and oxidizer would be injected to the nozzle and impinge with each other, combusting, and generating additional thrust.

Figure 9:
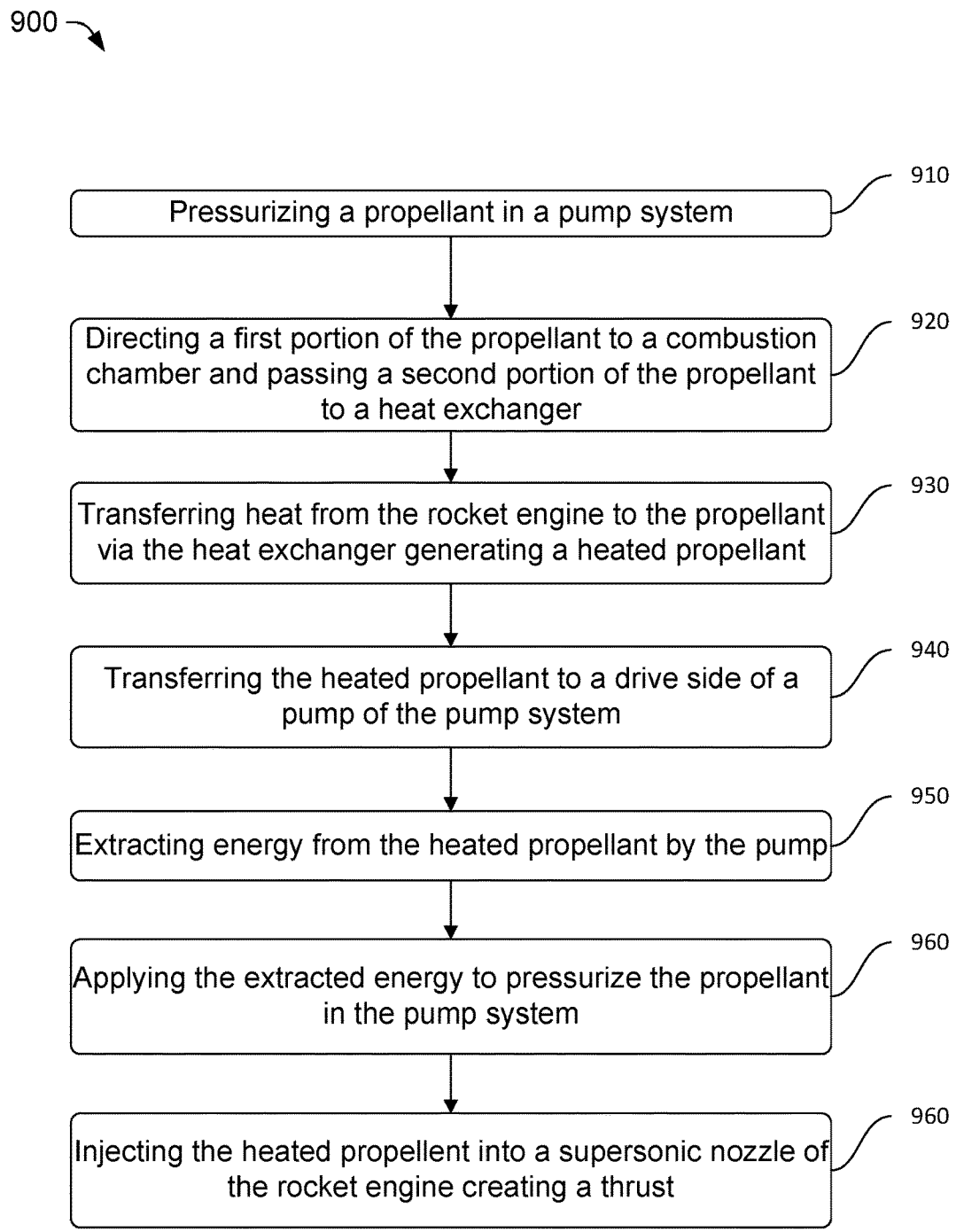
FIG. 9 is a flowchart of an example method for operating a rocket engine.

FIG. 9 a flowchart of an example technique 900 for operating an illustrative afterburning turbine exhaust cycle thruster. While examples are discussed using features discussed with respect to FIGS. 3 and 4, the processes and techniques discussed herein are not limited to those examples.

In examples, at operation 910, the system pressurizes a propellent in a pump system. For example, a propellant exits the propellant source 306 and enters the pressurizing side 324 of the pump 322 via the distribution system 304.

At operation 920, the system directs a first portion of the propellant to a combustion chamber and passing a second portion of the propellant to a heat exchanger. For example, the pump 322 increases the pressure of the propellant and delivers a portion of the propellant to the injector 308 for combustion in combustion chamber 310, and a portion of the propellant to the heat exchanger 328 via the distribution system 304.

At operation 930, the system transfers heat from the rocket engine to the propellant via the heat exchanger generating a heated propellant. For example, the heat exchanger 328 transfers heat from the engine 302, for example, from the supersonic rocket nozzle 312 and/or the combustion chamber 310, to the propellant. In examples, enough heat may be transferred to the propellant to cause a phase change of the propellant, for example, from a liquid state to a gaseous state or a more gaseous supercritical fluid. In examples, the addition of heat to the propellant increases a pressure of the propellant.

At operation 940, the system transfers the heated propellant to a drive side of the pump system. For example, the distribution system 304 delivers propellant from the heat exchanger 328 having had heat added to the propellant to the drive side 326 of the pump 322.

At operation 950, the system extracts energy from the heated propellant by the pump. In examples, the drive side 326 extracts energy from the propellant and powers the pressurizing side 324 of the pump 322. In examples, the drive side 326 extracts enough energy from the propellant to cause a phase change, for example, a gaseous state to a liquid state, a more gaseous supercritical fluid to a less gaseous supercritical fluid, or combinations thereof.

At operation 960, the system injects the heated propellent into a supersonic nozzle of the rocket engine creating a thrust. For example, the distribution system 304 delivers the propellant from the drive side 326 to the injection system 334 disposed in the supersonic divergent section 318. The propellant is injected into the supersonic divergent section 318 causing additional thrust to be created. In examples, the propellant combusts in the supersonic divergent section 318 generating thrust.

Additionally or alternatively, while the above example discusses propellant, this disclosure contemplates the rocket using a bipropellant system, where fuel and oxidizer propellants are used and delivered by separate systems. In examples, the fuel and oxidizer would be injected to the nozzle and impinge with each other, combusting, and generating additional thrust.

Additionally or alternatively, an augmented thrust system may be incorporated into the systems discussed above. In examples, operations discussed with respect to the technique 800 may be incorporated and used with operations discussed with respect to the technique 900.

Figure 10:
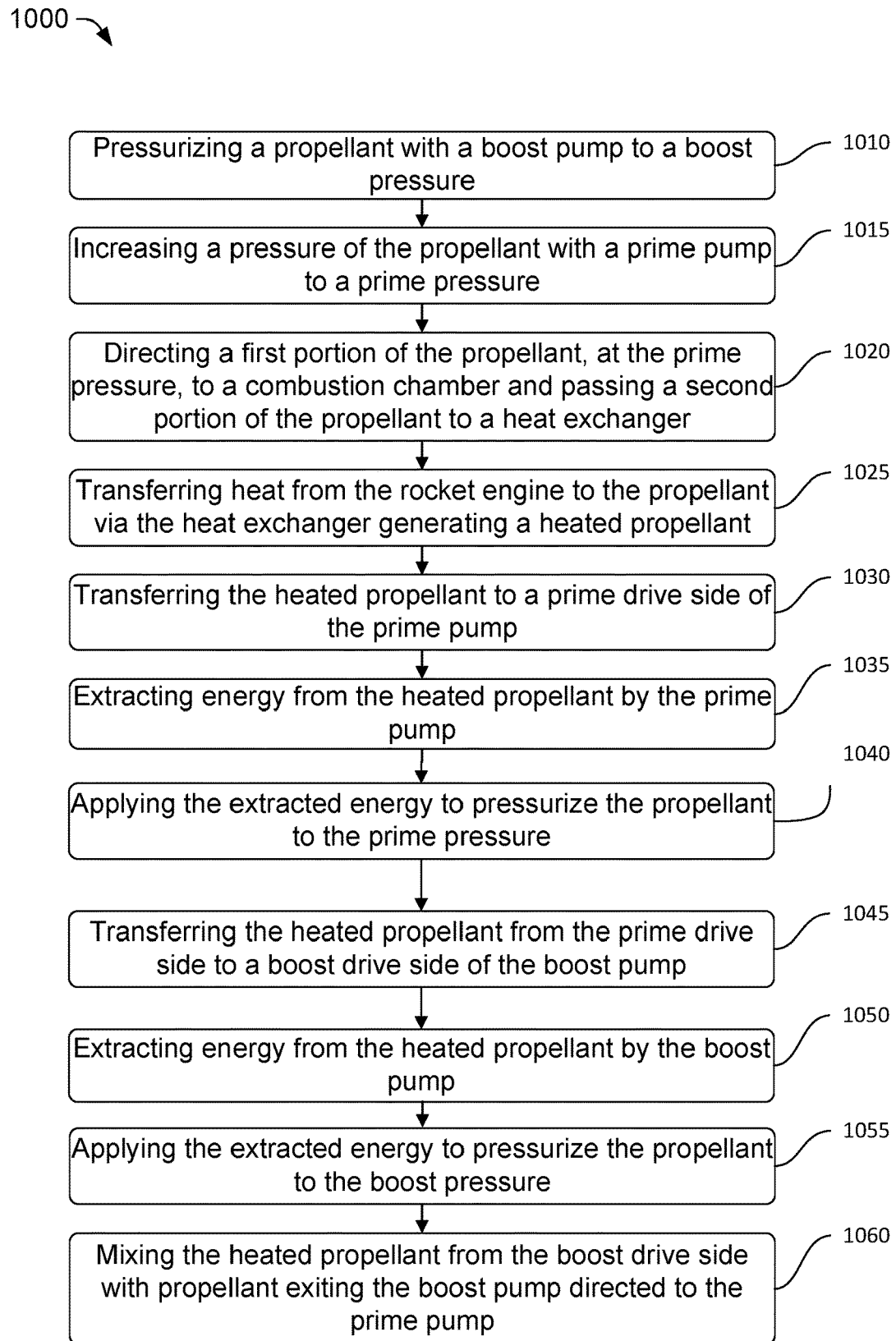
FIG. 10 is a flowchart of an example method for operating a rocket engine.

FIG. 10 a flowchart of an example technique 1000 for operating an illustrative boost injection turbine exhaust cycle thruster. While examples are discussed using features discussed with respect to FIGS. 5-7, the processes and techniques discussed herein are not limited to those examples.

In examples, system pressurizes the propellant. For example, at operation 1010, the system pressurizes the propellant with a boost pump to a boost pressure. For example, propellant exits the propellant source 506 and enters the boost pressurizing side 524 of the boost pump 522 via the distribution system 504. The boost pump 522 increases the pressure of the propellant to a boosted pressure and delivers the propellant to the prime pressurizing side 526 of the prime pump 523.

At operation 1015, the system increases a pressure of the propellant with a prime pump to a prime pressure. For example, the prime pump 523 increases the pressure of the of the propellant to a prime pressure.

At operation 1020, the system directs a first portion of the propellant, at the prime pressure, to a combustion chamber and passing a second portion of the propellant to a heat exchanger. For example, delivers a portion of the propellant to the injector 508 for combustion in combustion chamber 510, and a portion of the propellant to the heat exchanger 528 via the distribution system 504.

At operation 1025, the system transfers heat from the rocket engine to the propellant via the heat exchanger generating a heated propellant. For example, the heat exchanger 528 transfers heat from the engine 502, for example, from the supersonic rocket nozzle 512 and/or the combustion chamber 510, to the propellant. In examples, enough heat may be transferred to the propellant to cause a phase change of the propellant, for example, from a liquid state to a gaseous state, or a more gaseous supercritical fluid. In examples, the addition of heat to the propellant increases a pressure of the propellant.

At operation 1030, the system transfers the heated propellant to a prime drive side of the prime pump. For example, the distribution system 504 delivers propellant from the heat exchanger 528 having had heat added to the propellant to the prime drive side 527 of prime pump 523.

At operation 1035, the system extracts energy from the heated propellant by the prime pump. In examples, the prime drive side 527 extracts energy from the propellant. In examples, the prime drive side 527 extracts enough energy from the propellant to cause a phase change, for example, from a gaseous state to a liquid state or a less gaseous supercritical fluid. In examples, the propellant exits the prime drive side 527 at a prime drive exit pressure.

At operation 1040, the system applies the extracted energy to pressurize the propellant to the prime pressure. For example, pump uses the energy extracted by the prime drive side 527 to power the prime pressurizing side 526 of the prime pump 523.

At operation 1045, the system transfers the heated propellant from the prime drive side to a boost drive side of the boost pump. For examples, the distribution system 504 delivers the propellant from the prime drive side 527 to the boost drive side 525 of the boost pump 522.

At operation 1050, the system extracts energy from the heated propellant by the boost pump. In examples, the boost drive side 525 extracts energy from the propellant. In examples, the boost drive side 525 extracts enough energy from the propellant to cause a phase change, for example, from a gaseous state to a liquid state or a less gaseous supercritical fluid. In examples, the propellant exits the boost drive side 525 at a boost drive exit pressure.

At operation 1055, the system applies the extracted energy to pressurize the propellant to the boost pressure. For example, pump uses the energy extracted by the boost drive side 525 to power the boost pressurizing side 524 of the boost pump 522.

At operation 1060, the system mixes the heated propellant from the boost drive side with propellant exiting the boost pump directed to the prime pump. For example, the distribution system 504 delivers the propellant from the boost drive side 525 to a mixing station 534. In examples, the mixing station combines the propellant exiting the boost drive side 525 with the propellant exiting the boost pressurizing side 524. In examples, the mixing station may include a mixing configuration and/or a mixing device. For example, the mixing station 534 may include a mixing vane, a bend in a pipe after joining together, a operation or relatively sharp change in a cross sectional area of a pipe after joining together, a venturi based mixer, a mixing distance including a sufficient length of pipe after joining where the flows will mix, or a combination thereof. In examples the boost drive exit pressure is similar to the boosted pressure. In examples the boost drive exit pressure is lower than the boosted pressure. In examples the boost drive exit pressure is greater than the boosted pressure. In examples, the propellant with the higher pressure between the boosted pressure and the boost drive exit pressure is used to drive a mixing at the mixing station 534.

Additionally or alternatively, while the above example discusses propellant, this disclosure contemplates the rocket using a bipropellant system, where fuel and oxidizer propellants are used and delivered by separate systems. In examples, the fuel and oxidizer would be injected to the nozzle and impinge with each other, combusting, and generating additional thrust.

Example Clauses

Any of the example clauses in this section may be used with any other of the example clauses and/or any of the other examples or embodiments described herein.

A: A rocket propulsion system including: a supersonic rocket nozzle defined by a convergent section, a throat, and a supersonic divergent section; and a propellant injection system disposed at an annular region of the supersonic divergent section, the propellant injection system configured to inject propellant into the annular region of the supersonic divergent section, and is configured to generate thrust in following modes: an augmented thrust mode, such that augmented thrust is generated in the annular region from propellant injected into the annular region of the supersonic divergent section, and an active purge mode, such that a propellant pressure created from the propellant entering the annular region of the supersonic divergent section is greater than or equal to an annular region pressure created by other combustion sources at an injection location of the propellant injection system.

B: The rocket propulsion system of paragraph A, further including a control system for controlling the propellant injection system and activating the augmented thrust mode or active purge mode.

C: The rocket propulsion system of any of the paragraphs A-B, wherein the propellant is a bipropellant, the propellant injection system further comprises a fuel injection system and an oxidizer injection system.

D: The rocket propulsion system of any of the paragraphs A-C, wherein the fuel injection system comprises a fuel manifold and the oxidizer injection system comprises an oxidizer manifold.

E: The rocket propulsion system of any of the paragraphs A-D, wherein an injector of the oxidizer injection system and an injector of the fuel injection system are arranged such that oxidizer and fuel impinge on each other when injected.

F: The rocket propulsion system of any of the paragraphs A-E, wherein the propellant is injected into the annular region of the supersonic divergent section as a liquid in the augmented thrust mode, and the propellant is injected into the annular region of the supersonic divergent section as a gas in the active purge mode.

G: The rocket propulsion system of any of the paragraphs A-F, further comprising a valve selectively engaged and configured to control an amount of propellant injected into the annular region.

H: A rocket propulsion system comprising: a supersonic rocket nozzle defined by a convergent section, a throat, and a supersonic divergent section; and a propellant injection system disposed at a region of the supersonic divergent section, the propellant injection system configured to inject propellant into the region of the supersonic divergent section, and is configured to generate thrust in following modes: a large thrust mode, such that a large thrust is generated in the region from propellant injected into the region of the supersonic divergent section, and a low thrust mode, such that a propellant pressure created from the propellant entering the region of the supersonic divergent section is greater than or equal to a local pressure created by other combustion sources at an injection location of the propellant injection system, resulting in a low thrust, the large thrust being greater than the low thrust.

I: The rocket propulsion system of paragraph H, the modes further comprising an intermediate thrust, such that an intermediate thrust is generated in the region from propellant injected into the region of the supersonic divergent section, the intermediate thrust being greater than the low thrust and the large thrust being greater than the intermediate thrust.

J: The rocket propulsion system of any of the paragraphs H-I, further comprising a control system for controlling the propellant injection system and activating the large thrust mode or low thrust mode.

K: The rocket propulsion system of any of the paragraphs H-J, wherein the propellant is a bipropellant, the propellant injection system further comprises a fuel injection system and an oxidizer injection system.

L: The rocket propulsion system of any of the paragraphs H-K, wherein the fuel injection system comprises a fuel manifold and the oxidizer injection system comprises an oxidizer manifold.

M: The rocket propulsion system of any of the paragraphs H-L, wherein an injector of the oxidizer injection system and an injector of the fuel injection system are arranged such that oxidizer and fuel impinge on each other when injected.

N: The rocket propulsion system of any of the paragraphs H-M, wherein the propellant is injected into the region of the supersonic divergent section as a liquid in the in the large thrust mode, and the propellant is injected into the region of the supersonic divergent section as a gas in the low thrust mode.

O: The rocket propulsion system of any of the paragraphs H-N, further comprising a valve selectively engaged and configured to control an amount of propellant injected into the region of the supersonic divergent section.

P: A rocket propulsion system comprising: a supersonic rocket nozzle defined by a convergent section, a throat, and a supersonic divergent section; and a propellant injection system disposed at a region of the supersonic divergent section, the propellant injection system configured to inject propellant into the region of the supersonic divergent section, the propellant injection system comprising: a first injection system disposed at a first sector of the region; a second injection system disposed at a second sector of the region; and a third injection system disposed at a third sector of the region, the first sector, the second sector, and the third sector being distributed about the supersonic divergent section; the propellant injection system configured to generate thrust in following modes: a vectored thrust mode, such that an augmented thrust is generated in a first direction from propellant injected through at least the first injection system at a purge thrust level and at least one of the second injection system, or the third injection system at an augmented thrust level, the first direction being different from an axial direction defined by the region of the supersonic divergent section; and an axial thrust mode, such that an augmented thrust is generated in the axial direction from propellant injected into the region of the supersonic divergent section.

Q: The rocket propulsion system of paragraph P, the axial thrust mode further comprising: an augmented thrust mode, such that an augmented thrust is generated in the region from propellant injected into the region of the supersonic divergent section, or a purge thrust mode, such that a propellant pressure created from the propellant entering the region of the supersonic divergent section is greater than or equal to an region pressure created by other combustion sources at an injection location of the propellant injection system.

R: The rocket propulsion system of any of the paragraphs P-Q, further comprising a control system for controlling the propellant injection system and activating the vectored thrust mode and the axial thrust mode.

S: The rocket propulsion system of any of the paragraphs P-R, wherein the propellant is a bipropellant, the propellant injection system further comprises a fuel injection system and an oxidizer injection system.

T: The rocket propulsion system of any of the paragraphs P-S, wherein the fuel injection system comprises a fuel manifold and the oxidizer injection system comprises an oxidizer manifold.

U: The rocket propulsion system of any of the paragraphs P-T, wherein the region of the supersonic divergent section comprises an annular region.

V: The rocket propulsion system of any of the paragraphs H-N, wherein the region of the supersonic divergent section comprises an annular region.

W: A rocket propulsion system comprising: a supersonic rocket nozzle defined by a convergent section, a throat, a supersonic divergent section, and a heat transfer system configured to transfer heat from the supersonic rocket nozzle to a propellant; a propellant injection system disposed at region (for example an annular region) of the supersonic divergent section, the propellant injection system configured to inject propellant into the region of the supersonic divergent section; and a propellant pump feed system comprising: a pump configured to pressurize the propellant, the pump comprising a pressurizing side driven by a drive side; a distribution system configured to deliver a portion of the pressurized propellant from the pressurizing side to the heat transfer system, from the heat transfer system to the drive side, and from the drive side to the propellant injection system.

X: The rocket propulsion system of paragraph W, wherein the propellant is a bipropellant, the propellant injection system further comprises a fuel injection system and an oxidizer injection system.

Y: The rocket propulsion system of any of the paragraphs W-X, wherein the fuel injection system comprises a fuel manifold and the oxidizer injection system comprises an oxidizer manifold.

Z: The rocket propulsion system of any of the paragraphs W-Y, wherein an injector of the oxidizer injection system and an injector of the fuel injection system are arranged such that oxidizer and fuel impinge on each other when injected.

AA: The rocket propulsion system of any of the paragraphs W-Z, wherein the pump comprises a turbopump having a turbine on the drive side configured to extract energy from the portion of propellant after the portion of propellant received energy from the heat transfer system.

BB: The rocket propulsion system of any of the paragraphs W-AA, wherein the heat transfer system is configured to cause a phase change of the propellant based on an amount of energy transferred to the propellant from the supersonic rocket nozzle or a combustion chamber.

CC: The rocket propulsion system of any of the paragraphs W-BB, wherein the drive side is configured to cause a phase change of the propellant based on an amount of energy transferred from the propellant through the pump.

DD: The rocket propulsion system of any of the paragraphs W-CC, further comprising a second a propellant injection system disposed at a second region (for example an annular region) of the supersonic divergent section, the second propellant injection system configured to inject propellant into the second region of the supersonic divergent section.

EE: The rocket propulsion system of any of the paragraphs W-DD, further comprising a gas generator powered pump configured to generate thrust in following modes: a large thrust mode, such that a large thrust is generated in the region from propellant injected into the region of the supersonic divergent section, and a low thrust mode, such that a propellant pressure created from the propellant entering the region of the supersonic divergent section is greater than or equal to a local pressure created by other combustion sources at an injection location of the propellant injection system, resulting in a low thrust, the large thrust being greater than the low thrust.

FF: A method for operating a rocket engine, comprising: pressurizing a propellant in a pump system; directing a first portion of the propellant to a combustion chamber and passing a second portion of the propellant to a heat exchanger; transferring heat from the rocket engine to the propellant via the heat exchanger generating a heated propellant; transferring the heated propellant to a drive side of a pump of the pump system; extracting, by the pump, energy from the heated propellant; applying, by the pump, the extracted energy to pressurize the propellant in the pump system; transferring the propellant from the drive side of the pump to an injection system disposed on a supersonic nozzle of the rocket engine; and injecting, via the injection system, the propellant into the supersonic nozzle generating thrust.

GG: The method of paragraph FF, wherein the propellant is a bipropellant, the injection system further comprises a fuel injection system and an oxidizer injection system.

HH: The method of paragraphs FF and/or GG, wherein the fuel injection system comprises a fuel manifold and the oxidizer injection system comprises an oxidizer manifold.

II: The method of any of the paragraphs FF-HH, wherein an injector of the oxidizer injection system and an injector of the fuel injection system are arranged such that oxidizer and fuel impinge on each other when injected into the supersonic nozzle.

JJ: The method of any of the paragraphs FF-II, wherein the pump comprises a turbopump having a turbine on the drive side.

KK: The method of any of the paragraphs FF-JJ, wherein the transferring heat from the rocket engine to the propellant causes a phase change of the propellant based on an amount of energy transferred to the propellant from the supersonic rocket nozzle or a combustion chamber.

LL: The method of any of the paragraphs FF-KK, wherein extracting energy from the heated propellant causes a phase change of the propellant based on an amount of energy transferred from the propellant through the pump.

MM: The method of any of the paragraphs FF-LL, further comprising injecting a second a propellant, via a second injection system, disposed at a second region (for example an annular region) of the supersonic nozzle, generating a thrust in the supersonic nozzle.

NN: The method of any of the paragraphs FF-MM, further comprising: generating a pressurized drive gas, via a gas generator; pressurizing a second amount of propellent, via a pump powered by the pressurized drive gas; injecting the second amount of propellant into the supersonic nozzle generating thrust according to: a large thrust mode, such that a large thrust is generated in region (for example an annular region) from the second amount of propellant injected into the region of the supersonic nozzle, and a low thrust mode, such that a propellant pressure created from the propellant entering the supersonic nozzle is greater than or equal to a local pressure created by other combustion sources at an injection location of the propellant injection system, resulting in a low thrust, the large thrust being greater than the low thrust.

OO: A rocket propulsion system comprising: a supersonic rocket nozzle defined by a convergent section, a throat, a supersonic divergent section, and a heat transfer system configured to transfer heat from the supersonic rocket nozzle to a propellant; a bipropellant injection system disposed at region (for example an annular region) of the supersonic divergent section, the bipropellant injection system configured to inject fuel and oxidizer into the region of the supersonic divergent section; and a bipropellant pump feed system comprising: a fuel pump configured to pressurize the fuel, the fuel pump comprising a fuel pressurizing side driven by a fuel drive side; an oxidizer pump configured to pressurize the oxidizer, the oxidizer pump comprising an oxidizer pressurizing side driven by an oxidizer drive side; a distribution system configured to deliver a portion of the pressurized fuel from the fuel pressurizing side to the heat transfer system, from the heat transfer system to the fuel drive side, and from the fuel drive side to the bipropellant injection system, and configured to deliver a portion of the pressurized oxidizer from the oxidizer pressurizing side to the heat transfer system, from the heat transfer system to the oxidizer drive side, and from the oxidizer drive side to the bipropellant injection system.

PP: The rocket propulsion system of paragraph OO, wherein an injector of the oxidizer injection system and an injector of the fuel injection system are arranged such that oxidizer and fuel impinge on each other when injected.

QQ: A rocket propulsion system comprising: a supersonic rocket nozzle defined by a convergent section, a throat, a supersonic divergent section, and a heat transfer system configured to transfer heat from the supersonic rocket nozzle to a propellant; and a propellant pump feed system comprising: a prime pump configured to pressurize the propellant, the prime pump comprising a prime pressurizing side driven by a prime drive side; a boost pump configured to pressurize the propellant, the boost pump comprising a boost pressurizing side driven by a boost drive side; a distribution system configured to deliver a portion of the pressurized propellant from the prime pressurizing side to the heat transfer system, from the heat transfer system to the prime drive side, from the prime drive side to the boost drive side, and from the boost drive side to the prime pressurizing side.

RR: The rocket propulsion system of paragraph QQ, the distribution system further comprising a mixing system configured to mix propellent exiting the boost drive side with propellent entering the prime pressurizing side.

SS: The rocket propulsion system of any of the paragraphs QQ-RR, the mixing system comprising one or more of a bend, a mixing vane, or an operation configured to mix propellent exiting the boost drive side with propellent entering the prime pressurizing side.

TT: The rocket propulsion system of any of the paragraphs QQ-SS, the distribution system further configured to selectively direct propellant from the prime drive side to a propellant injection system disposed at region (for example an annular region) of the supersonic divergent section, the propellant injection system configured to inject propellant into the region of the supersonic divergent section.

UU: The rocket propulsion system of any of the paragraphs QQ-TT, wherein the propellant is a bipropellant, the propellant pump feed system further comprises a fuel pump feed system and an oxidizer pump feed system.

VV: The rocket propulsion system of any of the paragraphs QQ-UU, wherein the fuel pump feed system comprises a fuel prime pump and a fuel boost pump, and the oxidizer pump feed system comprises an oxidizer prime pump and an oxidizer boost pump.

WW: The rocket propulsion system of any of the paragraphs QQ-VV, wherein an amount of propellant directed to the injection system is based at least in part on a heat and pressure of propellant exiting the boost drive side and a heat and pressure of propellant exiting the boost pressurizing side, to avoid cavitation of the propellant in the prime pump.

XX: A method for operating a rocket engine, comprising: pressurizing a propellant with a boost pump to a boost pressure; increasing a pressure of the propellant with a prime pump to a prime pressure; directing a first portion of the propellant, at the prime pressure, to a combustion chamber and passing a second portion of the propellant to a heat exchanger; transferring heat from the rocket engine to the propellant via the heat exchanger generating a heated propellant; transferring the heated propellant to a prime drive side of the prime pump; extracting energy from the heated propellant by the prime pump; applying the extracted energy to pressurize the propellant to the prime pressure; transferring the heated propellant from the prime drive side to a boost drive side of the boost pump; extracting energy from the heated propellant by the boost pump; applying the extracted energy to pressurize the propellant to the boost pressure; and mixing the heated propellant from the boost drive side with propellant exiting the boost pump directed to the prime pump.

YY: The method of paragraph XX, wherein the mixing comprises sending the propellant through a bend, a mixing vane, or a venturi prior to the propellent entering the prime pump.

ZZ: The method of any of the paragraphs XX-YY, further comprising directing an amount of propellant from the prime drive side to a propellant injection system disposed at region (for example an annular region) of a supersonic divergent section of a nozzle; injecting the amount propellant into the supersonic divergent section of the nozzle.

AAA: The method of any of the paragraphs XX-ZZ, wherein an amount of propellant directed to the injection system is based at least in part on a heat and pressure of propellant exiting the boost drive side and a heat and pressure of propellant exiting the boost pressurizing side, to avoid cavitation of the propellant in the prime pump.

BBB: The method of any of the paragraphs XX-AAA, wherein the propellant is a bipropellant, and bipropellants are moved via a fuel pump feed system and an oxidizer pump feed system.

CCC: The method of any of the paragraphs XX-BBB, wherein the boost pump comprises a fuel boost pump and an oxidizer boost pump, the prime pump comprises a fuel prime pump and an oxidizer prime pump.

DDD: The method of any of the paragraphs XX-CCC, wherein the pump comprises a turbopump having a turbine on the drive side.

EEE: The method of any of the paragraphs XX-DDD, wherein the transferring heat from the rocket engine to the propellant causes a phase change of the propellant based on an amount of energy transferred to the propellant from a supersonic rocket nozzle or a combustion chamber.

FFF: The method of any of the paragraphs XX-EEE, wherein extracting energy from the heated propellant causes a phase change of the propellant based on an amount of energy transferred from the propellant through the prime pump.

GGG: The method of any of the paragraphs XX-FFF, wherein extracting energy from the heated propellant causes a phase change of the propellant based on an amount of energy transferred from the propellant through the boost pump.

HHH: A rocket propulsion system comprising: a supersonic rocket nozzle defined by a convergent section, a throat, a supersonic divergent section, and a heat transfer system configured to transfer heat from the supersonic rocket nozzle to a propellant; and a bipropellant pump feed system comprising: a fuel prime pump configured to pressurize fuel, the fuel prime pump comprising a fuel prime pressurizing side driven by a fuel prime drive side; a fuel boost pump configured to pressurize the fuel, the fuel boost pump comprising a fuel boost pressurizing side driven by a fuel boost drive side; an oxidizer prime pump configured to pressurize oxidizer, the oxidizer prime pump comprising a oxidizer prime pressurizing side driven by a oxidizer prime drive side; a oxidizer boost pump configured to pressurize the oxidizer, the oxidizer boost pump comprising a oxidizer boost pressurizing side driven by a oxidizer boost drive side; a distribution system configured to deliver a portion of the pressurized fuel from the fuel prime pressurizing side to the heat transfer system, from the heat transfer system to the fuel prime drive side, from the fuel prime drive side to the fuel boost drive side, and from the fuel boost drive side to the fuel prime pressurizing side, and configured to deliver a portion of the pressurized oxidizer from the oxidizer prime pressurizing side to the heat transfer system, from the heat transfer system to the oxidizer prime drive side, from the oxidizer prime drive side to the oxidizer boost drive side, and from the oxidizer boost drive side to the oxidizer prime pressurizing side.

III: The rocket propulsion system of paragraph HHH, the distribution system further comprising a mixing system configured to mix fuel exiting the fuel boost drive side with fuel entering the fuel prime pressurizing side, and configured to mix oxidizer exiting the oxidizer boost drive side with oxidizer entering the oxidizer prime pressurizing side.

JJJ: The rocket propulsion system of any of the paragraphs HHH-III, the distribution system further configured to selectively direct fuel from the fuel prime drive side to a fuel injection system disposed at a region (for example an annular region) of the supersonic divergent section, the fuel injection system configured to inject fuel into the region of the supersonic divergent section, and configured to selectively direct oxidizer from the oxidizer prime drive side to an oxidizer injection system disposed at the region of the supersonic divergent section, the oxidizer injection system configured to inject oxidizer into the region of the supersonic divergent section.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the operations herein may be presented in a certain order, in some cases the ordering may be changed so that certain inputs are provided at different times or in a different order without changing the function of the systems and methods described. The disclosed procedures could also be executed in different orders.

What is claimed is:

1. A rocket propulsion system comprising:
a supersonic rocket nozzle defined by a convergent section, a throat, and a supersonic divergent section;
heat transfer systems configured to transfer heat from at least a portion of the rocket propulsion system to each component of a bipropellant, wherein the bipropellant comprises a fuel component and an oxidizer component;
a fuel component injection system disposed at a region of the supersonic divergent section, the fuel component injection system configured to inject the fuel component into the region of the supersonic divergent section;
a fuel component pump feed system comprising:
a fuel pump configured to pressurize the fuel component, the fuel pump comprising a fuel pressurizing side driven by a fuel drive side; and
a fuel distribution system configured to deliver a portion of the pressurized fuel component from the fuel pressurizing side to a fuel heat transfer system, from the fuel heat transfer system to the fuel drive side, and from the fuel drive side to the fuel component injection system disposed at the region of the supersonic divergent section,
wherein the fuel drive side is configured to cause a phase change of the fuel component based on an amount of energy transferred from the fuel component through the fuel pump;
an oxidizer component injection system disposed at the region of the supersonic divergent section, the oxidizer component injection system configured to inject the oxidizer component into the region of the supersonic divergent section; and
an oxidizer component pump feed system comprising:
an oxidizer pump configured to pressurize the oxidizer component, the oxidizer pump comprising an oxidizer pressurizing side driven by an oxidizer drive side; and
an oxidizer distribution system configured to deliver a portion of the pressurized oxidizer component from the oxidizer pressurizing side to an oxidizer heat transfer system, from the oxidizer heat transfer system to the oxidizer drive side, and from the oxidizer drive side via an oxidizer turbine exhaust feed system to the oxidizer component injection system disposed at the region of the supersonic divergent section.

2. The rocket propulsion system of claim 1, wherein the fuel injection system comprises a fuel manifold and the oxidizer injection system comprises an oxidizer manifold.

3. The rocket propulsion system of claim 2, wherein an injector of the oxidizer injection system and an injector of the fuel injection system are arranged such that oxidizer and fuel impinge on each other and combust in the supersonic rocket nozzle.

4. The rocket propulsion system of claim 1, wherein the fuel pump comprises a turbopump having a turbine on the drive side configured to extract energy from the portion of the pressurized fuel component after the portion of the pressurized fuel component received energy from the fuel heat transfer system.

5. The rocket propulsion system of claim 1, wherein:
the fuel heat transfer system is configured to cause a phase change of the fuel component based on an amount of energy transferred to the fuel component from a first portion of the rocket propulsion system; and
wherein the oxidizer heat transfer system is configured to cause a phase change of the oxidizer component based on an amount of energy transferred to the oxidizer component from a second portion of the rocket propulsion system.

6. The rocket propulsion system of claim 1, further comprising a second bipropellant injection system disposed at a second region of the supersonic divergent section, the second bipropellant injection system configured to inject the bipropellant into the second region of the supersonic divergent section.

7. The rocket propulsion system of claim 6, further comprising a gas generator powered pump configured to generate thrust in following modes:
a large thrust mode, such that a large thrust is generated in the second region from bipropellant injected into the second region of the supersonic divergent section, and
a low thrust mode, such that a propellant pressure created from the bipropellant entering the second region of the supersonic divergent section is greater than or equal to a local pressure created by other combustion sources at an injection location of the bipropellant injection system, resulting in a low thrust, the large thrust being greater than the low thrust.

8. A method for operating a rocket engine, comprising:
pressurizing each respective component of a bipropellant in a respective pump system, wherein the bipropellant comprises a fuel component and an oxidizer component, and wherein the fuel component is pressurized in a fuel pump system and the oxidizer component is pressurized in an oxidizer pump system;
directing a first portion of the fuel component to a combustion chamber and passing a second portion of the fuel component to a fuel heat exchanger;
transferring heat from the rocket engine to the fuel component via the fuel heat exchanger generating a heated fuel component;
transferring the heated fuel component to a drive side of a fuel pump of the fuel pump system;
extracting, by the fuel pump, first energy from the heated fuel component;
applying, by the fuel pump, the extracted first energy to pressurize the fuel component in the fuel pump system, wherein the first energy from the heated fuel component causes a phase change of the fuel component based on an amount of first energy transferred from the fuel component through the fuel pump;
transferring the fuel component from the drive side of the fuel pump to a fuel injection system disposed on a supersonic nozzle of the rocket engine;
injecting, via the fuel injection system, the fuel component into the supersonic nozzle;
directing a first portion of the oxidizer component to the combustion chamber and passing a second portion of the oxidizer component to an oxidizer heat exchanger;
transferring heat from the rocket engine to the oxidizer component via the oxidizer heat exchanger generating a heated oxidizer component;
transferring the heated oxidizer component to a drive side of an oxidizer pump of the oxidizer pump system;
extracting, by the oxidizer pump, second energy from the heated oxidizer component;
applying, by the oxidizer pump, the extracted second energy to pressurize the oxidizer component in the oxidizer pump system;
transferring the oxidizer component from the drive side of the oxidizer pump via an oxidizer turbine exhaust feed system to an oxidizer injection system disposed on a supersonic nozzle of the rocket engine; and injecting, via the oxidizer injection system, the oxidizer component into the supersonic nozzle.

9. The method of claim 8, wherein the fuel injection system comprises a fuel manifold and the oxidizer injection system comprises an oxidizer manifold.

10. The method of claim 9, wherein the oxidizer injection system and the fuel injection system are arranged such that the oxidizer component and the fuel component impinge on each other and combust when injected into the supersonic nozzle.

11. The method of claim 10, wherein the fuel pump comprises a turbopump having a turbine on the drive side of the fuel pump.

12. The method of claim 8, wherein the transferring heat from the rocket engine to the fuel component causes the phase change of the fuel component based on the amount of energy transferred to the fuel component from the supersonic rocket nozzle or a combustion chamber.

13. The method of claim 8, further comprising injecting a second amount of propellant, via a second injection system, disposed at a second region of the supersonic nozzle, generating a thrust in the supersonic nozzle.

14. The method of claim 8, further comprising:
generating a pressurized drive gas, via a gas generator;
pressurizing a second amount of the bipropellant, via a pump powered by the pressurized drive gas;
injecting the second amount of the bipropellant into the supersonic nozzle generating thrust according to:
  a large thrust mode, such that a large thrust is generated in a region from the second amount of the bipropellant injected into the region of the supersonic nozzle, and
  a low thrust mode, such that a propellant pressure created from the second amount of the bipropellant entering the supersonic nozzle is greater than or equal to a local pressure created by other combustion sources at injection locations of the fuel injection system and the oxidizer injection system, resulting in a low thrust, the large thrust being greater than the low thrust.

15. A rocket propulsion system comprising:
a supersonic rocket nozzle defined by a convergent section, a throat, and a supersonic divergent section;
a heat transfer system configured to transfer heat from at least a portion of the rocket propulsion system to each component of a bipropellant, wherein the bipropellant comprises a fuel and an oxidizer;
a bipropellant injection system disposed at a region of the supersonic divergent section, the bipropellant injection system comprising a fuel injection system configured to inject the fuel into the region of the supersonic divergent section and an oxidizer injection system configured to inject the oxidizer into the region of the supersonic divergent section;
a bipropellant pump feed system comprising:
  a fuel pump configured to pressurize the fuel, the fuel pump comprising a fuel pressurizing side driven by a fuel drive side,
    wherein the fuel drive side is configured to cause a phase change of the fuel based on an amount of energy transferred from the fuel through the fuel pump;
  an oxidizer pump configured to pressurize the oxidizer, the oxidizer pump comprising an oxidizer pressurizing side driven by an oxidizer drive side;
a distribution system configured to deliver a portion of the pressurized fuel from the fuel pressurizing side to the heat transfer system, from the heat transfer system to the fuel drive side, and from the fuel drive side to the fuel injection system, and configured to deliver a portion of the pressurized oxidizer from the oxidizer pressurizing side to the heat transfer system, from the heat transfer system to the oxidizer drive side, and from the oxidizer drive side via an oxidizer turbine exhaust feed system to the oxidizer injection system.

16. The rocket propulsion system of claim 15, wherein the oxidizer injection system and the fuel injection system are arranged such that the oxidizer and the fuel impinge on each other and combust when injected.

17. A method for operating a rocket engine, comprising:
pressurizing a propellant in a pump system;
directing a first portion of the propellant to a combustion chamber and passing a second portion of the propellant to a heat exchanger;
transferring heat from the rocket engine to the propellant via the heat exchanger generating a heated propellant;
transferring the heated propellant to a drive side of a pump of the pump system;
extracting, by the pump, energy from the heated propellant component;
applying, by the pump, the extracted energy to pressurize the propellant in the pump system;
transferring the propellant from the drive side of the pump to an injection system disposed on a supersonic nozzle of the rocket engine;
injecting, via the injection system, the propellant into the supersonic nozzle generating thrust;
generating a pressurized drive gas, via a gas generator;
pressurizing a second amount of propellant, via a pump powered by the pressurized drive gas; and
injecting the second amount of propellant into the supersonic nozzle generating thrust according to:
  a large thrust mode, such that a large thrust is generated in a region from the second amount of propellant injected into the region of the supersonic nozzle, and
  a low thrust mode, such that a propellant pressure created from the propellant entering the supersonic nozzle is greater than or equal to a local pressure created by other combustion sources at an injection location of the propellant injection system, resulting in a low thrust, the large thrust being greater than the low thrust.

* * * * *